United States Patent
Chen et al.

(10) Patent No.: US 11,101,909 B2
(45) Date of Patent: Aug. 24, 2021

(54) SCRAMBLING CODE SEQUENCE GENERATION METHOD AND APPARATUS

(71) Applicant: HUAWEI TECHNOLOGIES CO., LTD., Guangdong (CN)

(72) Inventors: Dageng Chen, Ottawa (CA); Shibin Ge, Shanghai (CN); Xiaoyan Bi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 13 days.

(21) Appl. No.: 16/698,466

(22) Filed: Nov. 27, 2019

(65) Prior Publication Data

US 2020/0099461 A1 Mar. 26, 2020

Related U.S. Application Data

(63) Continuation of application No. PCT/CN2018/088632, filed on May 28, 2018.

(30) Foreign Application Priority Data

Jun. 1, 2017 (CN) .......................... 201710404714.2
Aug. 11, 2017 (CN) .......................... 201710686835.0

(51) Int. Cl.
*H04J 11/00* (2006.01)

(52) U.S. Cl.
CPC .................. *H04J 11/005* (2013.01)

(58) Field of Classification Search
CPC ....... H04J 11/005; H04J 13/10; H04B 7/0665; H04L 5/0035; H04L 25/03866; H04L 1/00; H04K 3/00
See application file for complete search history.

(56) References Cited

U.S. PATENT DOCUMENTS 9,794,918 B2 * 10/2017 Kang ...................... H04W 4/70
2011/0103250 A1    5/2011 Li et al.
(Continued)

FOREIGN PATENT DOCUMENTS

CN    101102125 A    1/2008
CN    103259635 A    8/2013
(Continued)

OTHER PUBLICATIONS

Samsung: "DMRS Scrambling for DL COMP",BGPP Draft; R1-120174, Jan. 31, 2012 (Jan. 31, 2012), XP050562741,total 4 pages.
(Continued)

*Primary Examiner* — Nizar N Sivji
(74) *Attorney, Agent, or Firm* — Womble Bond Dickinson (US) LLP

(57) ABSTRACT

This application discloses a scrambling code sequence generation method and apparatus, and belongs to the field of communication technologies. The method includes: determining a scrambling code sequence based on a configuration parameter of a transmission reception point TRP, where different TRPs correspond to different configuration parameters; and scrambling or descrambling data by using the scrambling code sequence. This application is used for data transmission, resolves a problem in a related technology that system performance is relatively poor because user equipment cannot better obtain, from received data, data sent by a TRP, and improves system performance.

19 Claims, 6 Drawing Sheets

(56) References Cited

U.S. PATENT DOCUMENTS

| | | | |
|---|---|---|---|
| 2014/0119266 A1 | 5/2014 | Ng et al. | |
| 2014/0321375 A1 | 10/2014 | Agiwal et al. | |
| 2015/0230216 A1* | 8/2015 | Liu | H04L 1/0072 370/329 |
| 2015/0282133 A1* | 10/2015 | Kakishima | H04L 5/0051 370/329 |
| 2016/0021632 A1 | 1/2016 | Sun et al. | |
| 2017/0221432 A1* | 8/2017 | Huang | G09G 3/3607 |
| 2017/0324502 A1 | 11/2017 | Wang et al. | |
| 2019/0230672 A1* | 7/2019 | Ko | H04L 5/005 |
| 2020/0099461 A1* | 3/2020 | Chen | H04J 11/005 |
| 2020/0162228 A1* | 5/2020 | Gao | H04L 5/0051 |
| 2020/0228267 A1* | 7/2020 | Park | H04B 7/0639 |

FOREIGN PATENT DOCUMENTS

| | | |
|---|---|---|
| CN | 103840909 A | 6/2014 |
| CN | 104285483 A | 1/2015 |
| CN | 104756418 A | 7/2015 |
| CN | 104770039 A | 7/2015 |
| CN | 105024778 A | 11/2015 |
| CN | 106664686 A | 5/2017 |
| WO | 2012124551 A1 | 9/2012 |
| WO | 2013117003 A1 | 8/2013 |
| WO | 2014125335 A1 | 8/2014 |

OTHER PUBLICATIONS

Huawei jet Al: "On data channel scrambling", 3GPP Draft; R1-1712159, Aug. 20, 2017 (Aug. 20, 2017), XP051314978, total 4 pages.

* cited by examiner

SCRAMBLING CODE SEQUENCE GENERATION METHOD AND APPARATUS

CROSS-REFERENCE TO RELATED APPLICATIONS

This application is a continuation of International Application No. PCT/CN2018/088632, filed on May 28, 2018, which claims priority to Chinese Patent Application No. 201710404714.2, filed on Jun. 1, 2017 and Chinese Patent Application No. 201710686835.0, filed on Aug. 11, 2017. The disclosures of the aforementioned applications are hereby incorporated by reference in their entireties.

TECHNICAL FIELD

This application relates to the field of communications technologies, and in particular, to a scrambling code sequence generation method and apparatus.

BACKGROUND

With rapid development of communications technologies, a user can obtain valid data anytime and anywhere based on a wireless communications system. A transmit end (for example, a base station) usually scrambles to-be-transmitted data by using a scrambling technology. When receiving scrambled data, a receive end (for example, user equipment (UE)) descrambles the scrambled data to obtain the original data. A scrambling technology may be used to distinguish data of different cells in different scrambling manners, and randomize and suppress inter-cell interference, so that UE can better obtain data of a cell of the UE from received data.

In the related technology, when scrambling the to-be-transmitted data by using the scrambling technology, the transmit end needs to generate a scrambling code sequence, and then obtains the scrambled data based on the scrambling code sequence and a sequence that corresponds to the to-be-transmitted data. The receive end receives the scrambled data, and descrambles the scrambled data by using the same scrambling code sequence, to obtain the original data. For example, in long term evolution (LTE) or long term evolution-advanced (LTE-A), a base station generates an initial scrambling code value, and then obtains a scrambling code sequence based on the initial scrambling code value. The initial scrambling code value $c_{init}$ generated by the base station is $c_{init}$ where $c_{init} = n_{RNTI} \cdot 2^{14} + q \cdot 2^{13} + \lfloor n_s/2 \rfloor \cdot 2^9 + N_{ID}^{cell}$. $n_{RNTI}$ is an identification code of UE. When there is only one codeword, q is 0. When two codewords are scheduled at the same time, q is 0 or 1. $n_s$ is a slot number. $\lfloor n_s/2 \rfloor$ indicates a subframe number (where $\lfloor \ \rfloor$ is a rounding down symbol), and $N_{ID}^{cell}$ is a cell identification code.

The fifth-generation (5G) new radio (NR) technology draws much attention currently. One 5G NR cell usually includes a plurality of transmission reception points (TRP) and a plurality of UEs. Each UE accepts services provided by a plurality of TRPs. All TRPs are independent of each other and share a cell identifier of the cell. A non-coherent joint transmission (NC-JT) solution is one of important solutions in NR. In NC-JT, each TRP does not know existence of the other TRPs, and the UE cannot determine whether received data comes from one TRP or a plurality of TRPs. If the scrambling code sequence is applied to a 5G NR cell in the NC-JT solution, when data scrambled or descrambled, it is assumed that the cell includes two TRPs: a first TRP and a second TRP. $n_{RNTI}$ corresponding to the first TRP is the same as $n_{RNTI}$ corresponding to the second TRP, both q corresponding to the first TRP and q corresponding to the second TRP are 0 (because each TRP does not know existence of the other TRP), and $n_s$ corresponding to the first TRP is the same as $n_s$ corresponding to the second TRP (because all TRPs simultaneously send data to the UE), and $N_{ID}^{cell}$ corresponding to the first TRP is the same as $N_{ID}^{cell}$ corresponding to the second TRP. All of $n_{RNTI}$, q, $n_s$ and $N_{ID}^{cell}$ are preset configuration parameters corresponding to the to-be-transmitted data. Therefore, an initial scrambling code value generated by the first TRP is completely the same as an initial scrambling code value generated by the second TRP. As a result, a scrambling code sequence determined by the first TRP is completely the same as a scrambling code sequence determined by the second TRP, and interference caused by either TRP to the other TRP is non-randomized interference. Neither the first TRP nor the second TRP can achieve an objective of scrambling in the 5G NR cell (where the objective of scrambling is randomizing interference caused by either any TRP to the other TRP). Consequently, the UE cannot better obtain, from the received data, data sent by the first TRP or the second TRP, and system performance is relatively poor.

SUMMARY

To resolve a problem in a related technology that system performance is relatively poor because user equipment cannot better obtain, from received data, data sent by a TRP, embodiments of the present invention provide a scrambling code sequence generation method and apparatus. The technical solutions are as follows:

According to a first aspect, a scrambling code sequence generation method is provided, and the method includes:

determining a scrambling code sequence based on a configuration parameter of a transmission reception point TRP, where different TRPs correspond to different configuration parameters; and scrambling or descrambling data by using the scrambling code sequence.

In one embodiment of the present invention, different TRPs correspond to different configuration parameters, different TRPs obtain different scrambling code sequences, and interference caused by any TRP to another TRP is randomized interference. Therefore, user equipment can better obtain, from received data, data sent by a corresponding TRP, thereby improving system performance.

The method may be applied to a TRP, or may be applied to user equipment. The TRP may be a data transmit end, or may be a data receive end. When the TRP is a data transmit end, the user equipment is a data receive end; or when the TRP is a data receive end, the user equipment is a data transmit end.

In one embodiment, the determining a scrambling code sequence based on a configuration parameter of a transmission reception point TRP includes:

generating an initial scrambling code value based on the configuration parameter; and determining the scrambling code sequence based on the initial scrambling code value.

In one embodiment of the present invention, different TRPs correspond to different configuration parameters, different TRPs generate different initial scrambling code values, different TRPs obtain different scrambling code sequences, and interference caused by any TRP to another TRP is randomized interference. Therefore, user equipment can better obtain, from received data, data sent by a corresponding TRP, thereby improving system performance.

In one embodiment, the configuration parameter includes a target parameter, and different TRPs correspond to different target parameters.

Further, the configuration parameter may further include: at least one of an identification code of user equipment, a slot number corresponding to a resource on which the data is located, a cell identification code, and a parameter used to indicate a codeword sequence number.

In one embodiment, the target parameter includes at least one of a parameter related to an RS, a beam parameter, a first identification code allocated to the TRP, a second identification code pre-allocated to the TRP, a parameter related to a synchronization signal, a QCL indication parameter, and a parameter related to a PDCCH.

The parameter related to the RS may be used to indicate configuration information of the RS. For example, the parameter related to the RS may include at least one of a port parameter of the RS and a resource parameter of the RS. The port parameter of the RS may be used to indicate at least one of a port number of the RS and a port group number of the RS, and a port group includes at least one port. The port number may be a port identification code, or may be a port index number. The port group number may be a port group identification code, or may be a port group index number.

The resource parameter of the RS may be used to indicate a location of the RS in time domain and/or frequency domain. For example, the location of the RS in time domain is an identification code of a symbol occupied by the RS, and the location of the RS in frequency domain is an identification code of a subcarrier occupied by the RS. The RS may be a DMRS, a CSI-RS, a PT-RS, a TRS, or an SRS. The DMRS may be an uplink DMRS or a downlink DMRS. The uplink DMRS may be a data channel DMRS or a control channel DMRS. The downlink DMRS may be a data channel DMRS or a control channel DMRS.

The port number of the RS may be determined according to a preset rule and based on a port number of at least one port corresponding to a codeword, and each port has one port number. For example, a largest or smallest port number may be selected from the port number of the at least one port.

The port group number of the RS may also be determined according to a preset rule and based on a port group number of at least one port group corresponding to a codeword. For example, a largest or smallest port group number may be selected from the port group number of the at least one port group.

The port parameter of the RS may further include a parameter related to the port number of the RS or the port group number of the RS, for example, an identifier of a layer used to map a codeword.

The beam parameter is used to indicate a beam for data transmission, for example, may be used to indicate an identification code of the beam for data transmission. The beam parameter may further include a parameter related to the identification code of the beam, such as a slot parameter or a frequency band parameter.

The first identification code is used to generate the initial scrambling code value. The second identification code is used to indicate the TRP.

The parameter related to the synchronization signal may include at least one of a preset parameter used to instruct to determine a synchronization signal sequence, a resource parameter of the synchronization signal, and a port parameter of the synchronization signal. The preset parameter is a root sequence parameter, a cyclic shift parameter, or a scrambling parameter. The resource parameter of the synchronization signal may be used to indicate a sending sequence number of an SS block of the synchronization signal or a sending sequence number of an uplink RACH occasion. The port parameter of the synchronization signal may be used to indicate at least one of a port number of the synchronization signal and a port group number of the synchronization signal, and a port group includes at least one port. The port number may be a port identification code, or may be a port index number. The port group number may be a port group identification code, or may be a port group index number. For example, the synchronization signal is a PSS, an SSS, or a PRACH signal.

Different TRPs have different QCL indication parameters. Each TRP corresponds to at least one QCL set, and each of the at least one QCL set includes an RS, a synchronization signal block (SS block), and the like that have a quasi co-location relationship. For example, the QCL indication parameter may be used to indicate at least one of a set identification code of a QCL set and a set index number of the QCL set.

The parameter related to the PDCCH may be used to indicate configuration information of the PDCCH. The parameter related to the PDCCH may include a resource parameter of the PDCCH. For example, the resource parameter of the PDCCH is used to indicate a location of the PDCCH in time domain and/or frequency domain.

For example, the location of the PDCCH in time domain is an identification code of a symbol occupied by the PDCCH, and the location of the PDCCH in frequency domain is an identification code of a subcarrier occupied by the PDCCH.

In one embodiment of the present invention, the target parameter may include at least one of a parameter related to an RS, a beam parameter, a first identification code allocated to the TRP, a second identification code pre-allocated to the TRP, a parameter related to a synchronization signal, a QCL indication parameter, and a parameter related to a PDCCH. Because different TRPs correspond to different configuration parameters, initial scrambling code values generated by the different TRPs based on the configuration parameters are different, and scrambling code sequences determined based on the initial scrambling code values are also different.

In one embodiment, identification codes allocated by different TRPs to the user equipment are different. For example, the initial scrambling code value $c_{init}$ generated by the TRP based on the configuration parameter may be expressed as: $c_{init}=f(UEid, q, n_s, N_{ID}^{NRcell})$, where UEid is the identification code of the user equipment, $n_s$ is the slot number corresponding to the resource on which data is located, q is the parameter used to indicate the codeword sequence number, and $N_{ID}^{NRcell}$ is the cell identification code. $\lfloor n_s/2 \rfloor$ indicates a subframe number (where $\lfloor \ \rfloor$ is a rounding down symbol).

In one embodiment, the target parameter further includes a group identification code of a TRP group to which the TRP belongs, where the TRP group includes at least one TRP.

According to a second aspect, a scrambling code sequence generation apparatus is provided. The scrambling code sequence generation apparatus includes at least one module, and the at least one module is configured to implement the scrambling code sequence generation method according to the first aspect.

According to a third aspect, a scrambling code sequence generation apparatus is provided. The scrambling code sequence generation apparatus includes at least one processor and at least one interface. The processor and the interface are connected by using a bus. The processor is configured to:

determine a scrambling code sequence based on a configuration parameter of a transmission reception point TRP, where different TRPs correspond to different configuration parameters; and scramble or descramble data by using the scrambling code sequence.

In one embodiment, the processor is configured to: generate an initial scrambling code value based on the configuration parameter; and determine the scrambling code sequence based on the initial scrambling code value.

In one embodiment, the configuration parameter includes a target parameter, and different TRPs correspond to different target parameters.

Further, the configuration parameter may further include: at least one of an identification code of user equipment, a slot number corresponding to a resource on which the data is located, a cell identification code, and a parameter used to indicate a codeword sequence number.

In one embodiment, the target parameter includes at least one of a parameter related to an RS, a beam parameter, a first identification code allocated to the TRP, a second identification code pre-allocated to the TRP, a parameter related to a synchronization signal, a QCL indication parameter, and a parameter related to a PDCCH.

The parameter related to the RS may be used to indicate configuration information of the RS. For example, the parameter related to the RS may include at least one of a port parameter of the RS and a resource parameter of the RS. The port parameter of the RS may be used to indicate at least one of a port number of the RS and a port group number of the RS, and a port group includes at least one port. The resource parameter of the RS may be used to indicate a location of the RS in time domain and/or frequency domain. The RS may be a DMRS, a CSI-RS, a PT-RS, a TRS, or an SRS. The DMRS may be an uplink DMRS or a downlink DMRS. The uplink DMRS may be a data channel DMRS or a control channel DMRS. The downlink DMRS may be a data channel DMRS or a control channel DMRS.

The port parameter of the RS may further include a parameter related to the port number of the RS or the port group number of the RS, for example, an identifier of a layer used to map a codeword.

The beam parameter is used to indicate a beam for data transmission, for example, may be used to indicate an identification code of the beam for data transmission.

The first identification code is used to generate the initial scrambling code value. The second identification code is used to indicate the TRP.

The parameter related to the synchronization signal may include at least one of a preset parameter used to instruct to determine a synchronization signal sequence, a resource parameter of the synchronization signal, and a port parameter of the synchronization signal. The preset parameter is a root sequence parameter, a cyclic shift parameter, or a scrambling parameter. The resource parameter of the synchronization signal may be used to indicate a sending sequence number of an SS block of the synchronization signal or a sending sequence number of an uplink RACH occasion. The port parameter of the synchronization signal may be used to indicate at least one of a port number of the synchronization signal and a port group number of the synchronization signal, and a port group includes at least one port. For example, the synchronization signal is a PSS, an SSS, or a PRACH signal.

Different TRPs have different QCL indication parameters. For example, the QCL indication parameter may be used to indicate at least one of a set identification code of a QCL set and a set index number of the QCL set.

The parameter related to the PDCCH may be used to indicate configuration information of the PDCCH. The parameter related to the PDCCH may include a resource parameter of the PDCCH. For example, the resource parameter of the PDCCH is used to indicate a location of the PDCCH in time domain and/or frequency domain.

In one embodiment, identification codes allocated by different TRPs to the user equipment are different.

In one embodiment, the target parameter further includes a group identification code of a TRP group to which the TRP belongs, where the TRP group includes at least one TRP.

The processor may be a chip, and when implemented by using hardware, the processor may be a logic circuit, an integrated circuit, or the like. The processor may be a general-purpose processor, and is implemented by reading software code stored in a memory. The memory may be integrated into the processor, or may exist independently outside the processor.

Further, the scrambling code sequence generation apparatus further includes an antenna. The scrambling code sequence generation apparatus further includes other functional components, for example, a battery module and a wired/wireless charging structure. The antenna is configured to send and receive a radio signal, and the antenna may coordinate with an interface to send and receive a signal in, for example, a 5G technology.

According to a fourth aspect, a computer-readable storage medium is provided. The computer-readable storage medium stores an instruction, and when the computer-readable storage medium runs on a computer, the computer is enabled to perform the scrambling code sequence generation method provided in the first aspect.

According to a fifth aspect, a computer program product that includes an instruction is provided. When the computer program product runs on a computer, the computer is enabled to perform the scrambling code sequence generation method provided in the first aspect.

Technical effects obtained in the second aspect to the fifth aspect are similar to technical effects obtained by using a corresponding technical means in the first aspect. Details are not described herein again.

The technical solutions provided in the embodiments of the present invention bring the following beneficial effects.

The scrambling code sequence can be determined based on the configuration parameter of the TRP; and data is scrambled or descrambled by using the scrambling code sequence. Different TRPs correspond to different configuration parameters. Compared with a related technology, different TRPs obtain different scrambling code sequences, and interference caused by any TRP to another TRP is randomized interference, thereby improving system performance.

BRIEF DESCRIPTION OF DRAWINGS

FIG. 2-1 is a flowchart of a scrambling code sequence generation method according to an embodiment of the present invention;

FIG. 2-2 is a schematic diagram of six REs corresponding to one RS according to an embodiment of the present invention;

FIG. 2-3 is a schematic diagram of a sending sequence of an SS block according to an embodiment of the present invention;

FIG. 3-1 is a schematic structural diagram of a scrambling code sequence generation apparatus according to an embodiment of the present invention;

FIG. 3-2 is a schematic structural diagram of a determining module according to the embodiment shown in FIG. 3-1.

DESCRIPTION OF EMBODIMENTS

To make the objectives, technical solutions, and advantages of this application clearer, the following further describes the implementations of this application in detail with reference to the accompanying drawings.

Figure 1:
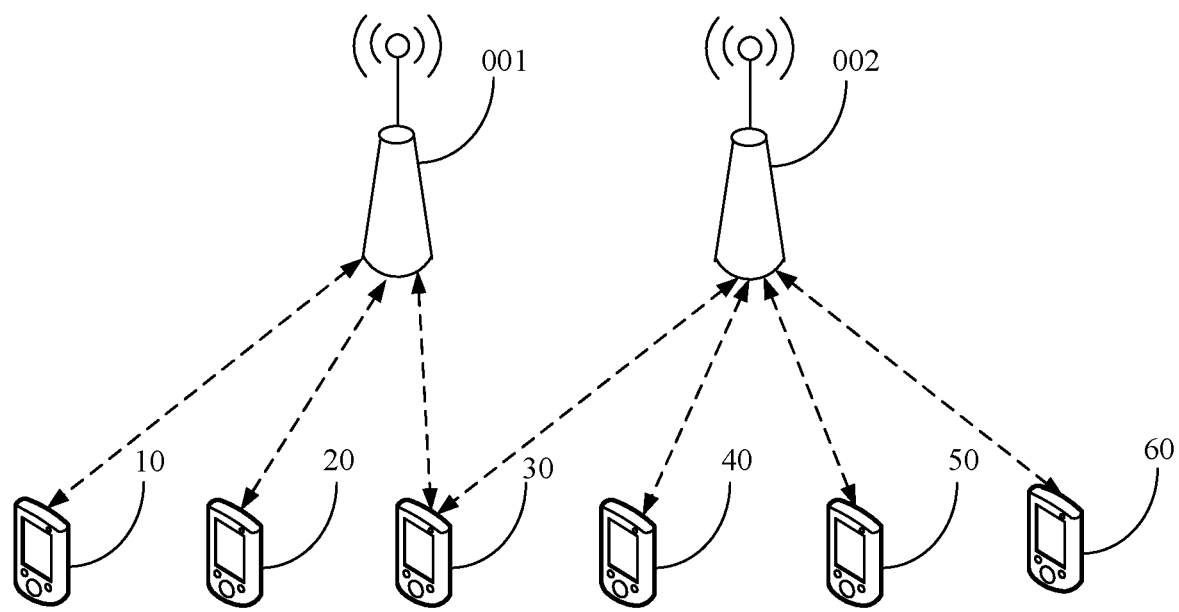
FIG. 1 is a schematic diagram of an implementation environment related to embodiments of this application.

FIG. 1 is a schematic diagram of an implementation environment according to embodiments of this application. The implementation environment may be a 5G NR cell. As shown in FIG. 1, a 5G NR cell generally includes a plurality of TRPs and a plurality of user equipments. For example, the TRP (for example, a base station) is a data transmit end, and the user equipment is a data receive end. Each user equipment accepts services provided by a plurality of TRPs. The TRP determines a scrambling code sequence based on a configuration parameter, next, scrambles to-be-transmitted data by using the scrambling code sequence, to obtain scrambled data, and then, sends the scrambled data to the user equipment. The user equipment determines the scrambling code sequence based on the configuration parameter, and then descrambles the scrambled data by using the scrambling code sequence, to obtain original data.

For example, the plurality of TRPs in FIG. 1 include a first TRP 001 and a second TRP 002, the first TRP 001 provides services for three user equipments, and the three user equipments are respectively user equipment 10, user equipment 20, and user equipment 30. The second TRP 002 serves four user equipments, and the four user equipments are respectively user equipment 30, user equipment 40, user equipment 50, and user equipment 60. The user equipment 30 accepts services provided by the first TRP 001 and the second TRP 002.

In this application, the TRP may be a data transmit end, or may be a data receive end. This is not limited in this application.

In this implementation environment and the following embodiments, the user equipment may be UE in a general sense. In addition, the user equipment may also be a mobile console, an access terminal, a subscriber unit, a subscriber station, a mobile station, a remote station, a remote terminal, a mobile device, a user terminal, a terminal, a wireless communications device, a user agent, a user apparatus, or the like. The user equipment may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, an in-vehicle device, a wearable device, a mobile station in a future 5G network, a terminal device in a future evolved public land mobile network (PLMN), or the like. In addition, the user equipment may further include another device, for example, a relay, that can communicate with an access network device (for example, a base station).

Figures 1, 2:
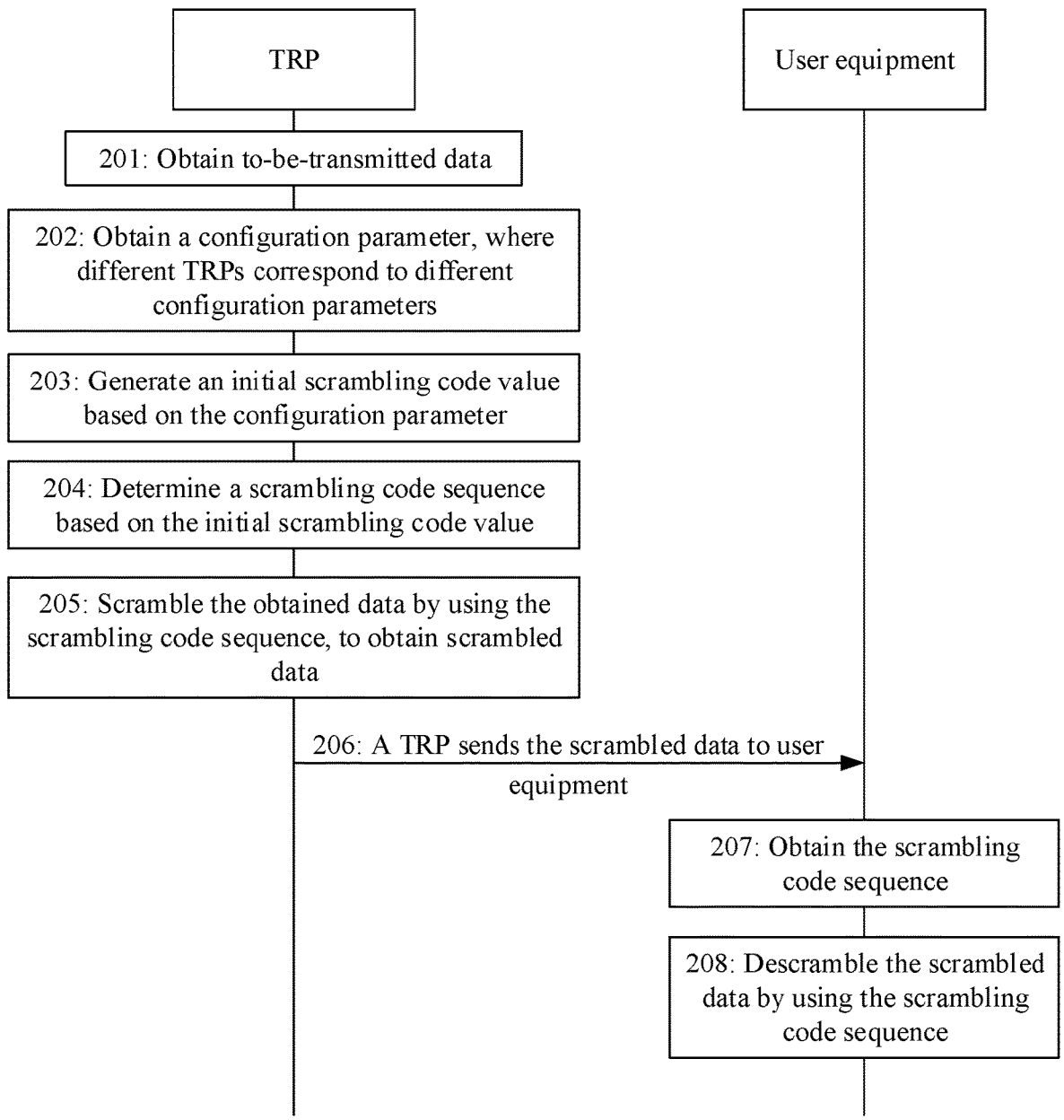
Figure 2:
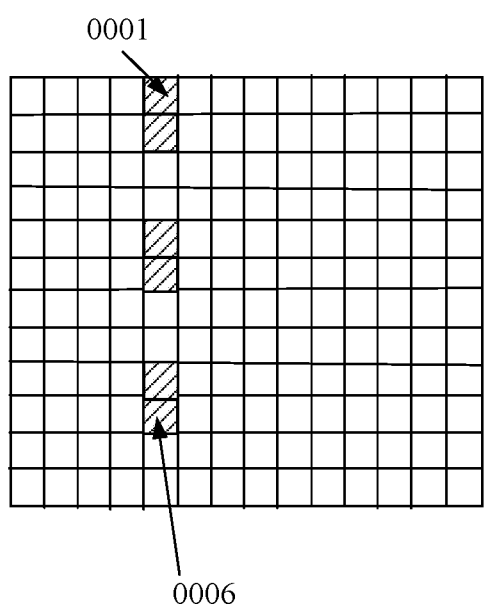

FIG. 2-1 is a flowchart of a scrambling code sequence generation method according to an embodiment of the present invention. The method may be applied to the implementation environment shown in FIG. 1. In this embodiment of the present invention, an example in which a TRP is a data transmit end and user equipment is a data receive end is used for description. As shown in FIG. 2-1, the method may include the following operations.

Operation 201: The TRP obtains to-be-transmitted data.

Operation 202: The TRP obtains a configuration parameter, where different TRPs correspond to different configuration parameters.

The different TRPs in this embodiment of the present invention are different TRPs serving same user equipment. Because different TRPs correspond to different configuration parameters, scrambling code sequences determined by the different TRPs based on the configuration parameters are also different. For example, configuration parameters corresponding to the first TRP 001 and the second TRP 002 in FIG. 1 are different.

Operation 203: The TRP generates an initial scrambling code value based on the configuration parameter.

In one embodiment, the TRP may first generate the initial scrambling code value based on the configuration parameter; and then determine a scrambling code sequence based on the initial scrambling code value.

In one embodiment, the configuration parameter includes a target parameter, and different TRPs correspond to different target parameters. For example, the target parameter may include at least one of a parameter related to a reference signal (RS), a beam parameter, a first identification code allocated to the TRP, a second identification code pre-allocated to the TRP, a parameter related to a synchronization signal, a quasi co-location (QCL) indication parameter, and a parameter related to a physical downlink control channel (PDCCH).

The parameter related to the RS in the target parameter may be used to indicate configuration information of the RS. For example, the parameter related to the RS may include at least one of a port parameter of the RS and a resource parameter of the RS. For example, the port parameter of the RS may be used to indicate at least one of a port number of the RS and a port group number of the RS, and a port group includes at least one port. The port number may be a port identification code, or may be a port index number. The port group number may be a port group identification code, or may be a port group index number. The resource parameter of the RS may be used to indicate a location of the RS in time domain and/or frequency domain.

For example, the RS may be a demodulation reference signal (DMRS), a channel state information reference signal (CSI-RS), a phase tracking reference signal (PT-RS), a fine time and frequency tracking reference signal (TRS), or a sounding reference signal (SRS). The DMRS may be an uplink DMRS or a downlink DMRS. The uplink DMRS may be a data channel DMRS or a control channel DMRS. The downlink DMRS may be a data channel DMRS or a control channel DMRS. The DMRS is used to estimate a transmission channel.

The beam parameter in the target parameter is used to indicate a beam for data transmission, for example, may be used to indicate an identification code of the beam for data transmission.

The first identification code in the target parameter is used to generate the initial scrambling code value. The second identification code in the target parameter is used to indicate the TRP.

The parameter related to the synchronization signal in the target parameter may include at least one of a preset parameter used to instruct to determine a synchronization signal sequence, a resource parameter of the synchronization signal, and a port parameter of the synchronization signal. The preset parameter is a root sequence parameter, a cyclic shift parameter, or a scrambling parameter. The resource parameter of the synchronization signal may be used to indicate a sending sequence number of a synchronization signal block of the synchronization signal or a sending sequence number of an uplink random access channel occasion. Generally, the synchronization signal block is referred to as an SS block. The random access channel occasion is referred to as a RACH occasion. The port parameter of the synchronization signal may be used to indicate at least one of a port number of the synchronization signal and a port group number of the synchronization signal, and a port group includes at least one port. The port number may be a port identification code, or may be a port index number. The port group number may be a port group identification code, or may be a port group index number.

For example, the synchronization signal may be a primary synchronization signal (PSS), a secondary synchronization signal (SSS), or a physical random access channel (PRACH) signal.

Different TRPs have different QCL indication parameters. Each TRP corresponds to at least one QCL set, and each of the at least one QCL set includes an RS, a synchronization signal block (SS block), and the like that have a quasi co-location relationship.

The parameter related to the PDCCH in the target parameter may be used to indicate configuration information of the PDCCH. For example, the parameter related to the PDCCH includes a resource parameter of the PDCCH. The resource parameter of the PDCCH may be used to indicate a location of the PDCCH in time domain and/or frequency domain.

Further, the target parameter may further include a group identification code of a TRP group to which the TRP belongs, where the TRP group includes at least one TRP.

Further, the configuration parameter may further include: at least one of an identification code $n_{RNTI}$ of the user equipment, a slot number $n_s$ corresponding to a resource on which the data is located, a cell identification code $N_{ID}^{cell}$, and a parameter q used to indicate a codeword sequence number. When there is only one codeword, q is 0. When two codewords are scheduled at the same time, q is 0 or 1.

In one embodiment, identification codes allocated by different TRPs to the user equipment may be different.

Further, the target parameter further includes a group identification code of a TRP group to which the TRP belongs, where the TRP group includes at least one TRP.

In this embodiment of the present invention, the configuration parameter may have a plurality of forms. Correspondingly, the initial scrambling code value generated by the TRP based on the configuration parameter also has a plurality of forms.

For example, in a first implementable manner, the configuration parameter includes: an identification code $n_{RNTI}$ of the user equipment, a slot number $n_s$ corresponding to a resource on which the data is located, a cell identification code $N_{ID}^{cell}$, and a target parameter, where the target parameter includes a port parameter $Por_{RS}$ of the RS. The port parameter of the RS may be used to indicate at least one of a port number of the RS and a port group number of the RS, and a port group includes at least one port. Different TRPs correspond to different port parameters of RSs.

The initial scrambling code value $c_{init}$ generated by the TRP based on the configuration parameter may be expressed as: $c_{init}=f(n_{RNTI}, Por_{RS}, n_s, N_{ID}^{NRcell})$.

For example, $c_{init}=n_{RNTI} \cdot m1 + Por_{RS} \cdot m2 + \lfloor n_s/2 \rfloor \cdot m3 + N_{ID}^{NRcell}$, where m1, m2, and m3 are all constants. For example, $m1=2^{p1}$, $m2=2^{p2}$, and $m3=2^{p3}$, where p1, p2, and p3 are all constants. For example, the initial scrambling code value $c_{init}$ generated by the TRP based on the configuration parameter may be expressed as: $c_{init}=n_{RNTI} \cdot 2^{14} + Por_{RS} \cdot 2^{13} + \lfloor n_s/2 \rfloor \cdot 2^9 + N_{ID}^{NRcell}$.

Further, the configuration parameter may further include a parameter q used to indicate a codeword sequence number. In this case, the initial scrambling code value $c_{init}$ generated by the TRP based on the configuration parameter may be expressed as: $c_{init}=f(n_{RNTI}, q, Por_{RS}, n_s, N_{ID}^{NRcell})$.

For example, the RS may be a DMRS, a CSI-RS, a PT-RS, a TRS, or an SRS. A type of the RS is not limited in this embodiment of the present invention.

Herein, an example in which the RS is a DMRS is used for description. The DMRS may be an uplink DMRS or a downlink DMRS. The uplink DMRS may be a data channel DMRS or a control channel DMRS. The downlink DMRS may be a data channel DMRS or a control channel DMRS. A type of the DMRS is not limited in this embodiment of the present invention.

In one aspect, the port parameter of the DMRS may include a port number of the DMRS, where the port number may be a port identification code, or may be a port index number. In this embodiment of the present invention, the port number of the DMRS is denoted as $Port_{DMRS}$. The initial scrambling code value $c_{init}$ generated by the TRP based on the configuration parameter may be expressed as: $c_{init}=f(n_{RNTI}, Port_{DMRS}, n_s, N_{ID}^{NRcell})$.

For example, $c_{init}=n_{RNTI} \cdot m1 + Port_{DMRS} \cdot m2 + \lfloor n_s/2 \rfloor \cdot m3 + N_{ID}^{NRcell}$, where m1, m2, and m3 are all constants. For example, $m1=2^{p1}$, $m2=2^{p2}$, and $m3=2^{p3}$, where p1, p2, and p3 are all constants.

For example, the initial scrambling code value $c_{init}$ generated by the TRP based on the configuration parameter may be expressed as:

$$c_{init}=n_{RNTI} \cdot 2^{14} + Port_{DMRS} \cdot 2^{13} + \lfloor n_s/2 \rfloor \cdot 2^9 + N_{ID}^{NRcell} \quad (1), \text{where}$$

$n_{RNTI}$ is the identification code of the user equipment, $Port_{DMRS}$ is the port number of the DMRS, $n_s$ is the slot number corresponding to the resource on which the data is located, and $N_{ID}^{NRcell}$ is the cell identification code.

It should be additionally noted that, in a 5G NR technology, one codeword corresponds to at least one DMRS port, and each DMRS port has a port number. Generally, one codeword corresponds to a maximum of four DMRS ports. $Port_{DMRS}$ in the formula (1) may be determined by the TRP (or the user equipment) according to a preset rule and based on a port number of the at least one DMRS port corresponding to the codeword. For example, a codeword transmitted by the first TRP 001 in FIG. 1 corresponds to three DMRS ports, a port number of a first DMRS port is 1, a port number of a second DMRS port is 2, and a port number of a third DMRS port is 3. A codeword transmitted by the second TRP 002 corresponds to two DMRS ports, a port number of a first DMRS port is 4, and a port number of a second DMRS port is 5. Therefore, the first TRP 001 may select the smallest DMRS port number 1 from the three DMRS port numbers, that is, $Port_{DMRS}$ in the formula (1) is 1. The second TRP 002 may select the smaller DMRS port number 4 from the two DMRS port numbers, that is, $Port_{DMRS}$ in the formula (1) is 4. In addition, the first TRP 001 and the second TRP 002 may alternatively select the largest DMRS port numbers from the DMRS port numbers corresponding to the first TRP 001 and the second TRP 002, that is, the first TRP 001 may select the DMRS port number 3 from the three DMRS port numbers, and the second TRP 002 may select the DMRS port number 5 from the two DMRS port numbers.

In one embodiment, the initial scrambling code value $c_{init}$ generated by the TRP based on the configuration parameter may be alternatively expressed as: $c_{init}=f(Port_{DMRS})$.

In addition, because the configuration parameter may include: at least one of the identification code $n_{RNTI}$ of the user equipment, the slot number $n_s$ corresponding to the resource on which the data is located, and the cell identification code $N_{ID}^{NRcell}$, the initial scrambling code value $c_{init}$ generated by the TRP based on the configuration parameter may be alternatively expressed as: $c=f(n_{RNTI}, Port_{DMRSGroupID}, n_s, N_{ID}^{NRcell})$, $c_{init}=f(n_{RNTI}, Port_{DMRS}, n_s)$, $c_{init}=f(n_{RNTI}, Port_{DMRS}, N_{ID}^{NRcell})$, or the like.

For example, $c_{init}=n_{RNTI} \cdot m1 + Port_{DMRS} \cdot m2 + \lfloor n_s/2 \rfloor \cdot m3$, where m1, m2, and m3 are all constants. For example, $m1=2^{p1}$, $m2=2^{p2}$, and $m3=2^{p3}$, where p1, p2, and p3 are all constants. For example, the initial scrambling code value $c_{init}$ generated by the TRP based on the configuration parameter may be expressed as: $c_{init}=n_{RNTI} \cdot 2^{14} + Port_{DMRS} \cdot 2^{13} + \lfloor n_s/2 \rfloor \cdot 2^9$.

In another aspect, the port parameter of the DMRS may include a port group number of the DMRS, where the port group number may be a port group identification code, or may be a port group index number. A port group includes at least one port, and identification codes or index numbers of different port groups are different. For example, there are a total of eight ports, the eight ports are classified into two groups, an identification code of a first port group is 1, and an identification code of a second port group is 2. Alternatively, there are a total of eight ports, the eight ports are classified into two groups, an index number of a first port group is 0, and an index number of a second port group is 1. Herein, the port group identification code of the DMRS is used as an example for description. In this embodiment of the present invention, the port group identification code of the DMRS is denoted as $Port_{DMRSGroupID}$.

The initial scrambling code value $c_{init}$ generated by the TRP based on the configuration parameter may be expressed as: $c_{init}=f(n_{RNTI}, Port_{DMRSGroupID}, n_s, N_{ID}^{NRcell})$.

For example, $c_{init}=n_{RNTI} \cdot m1 \ Port_{DMRSGroupID} \cdot m2 + \lfloor n_s/2 \rfloor \cdot m3 + N_{ID}^{NRcell}$, where m1, m2, and m3 are all constants. For example, $m1=2^{p1}$, $m2=2^n$, and $m3=2^{p2}$, where p1, n, and p2 are all constants.

For example, the initial scrambling code value $c_{init}$ generated by the TRP based on the configuration parameter may be expressed as:

$$c_{init}=n_{RNTI} \cdot 2^{14} + Port_{DMRSGroupID} \cdot 2^n + \lfloor n_s/2 \rfloor \cdot 2^9 + N_{ID}^{NRcell}) \quad (2), \text{ where}$$

$n_{RNTI}$ is the identification code of the user equipment, $Port_{DMRSGroupID}$ is the port group identification code of the DMRS, $n_s$ is the slot number corresponding to the resource on which the data is located, and $N_{ID}^{NRcell}$ is the cell identification code.

$Port_{DMRSGroupID}$ in the formula (2) may be determined by using a port group identification code corresponding to the TRP (or the user equipment). For example, a port group identification code corresponding to the first TRP 001 in FIG. 1 is 1, that is, $Port_{DMRSGroupID}$ in the formula (2) is 1. A port group identification code corresponding to the second TRP 002 is 2, that is, $Port_{DMRSGroupID}$ in the formula (2) is 2.

Similarly, one codeword may correspond to at least one port group. $Port_{DMRSGroupID}$ in the formula (2) may be determined by the TRP (or the user equipment) according to a preset rule and based on an identification code of the at least one port group corresponding to the codeword. For example, a codeword transmitted by the first TRP 001 in FIG. 1 corresponds to two port groups, an identification code of a first port group is 11, and an identification code of a second port group is 12. A codeword transmitted by the second TRP 002 corresponds to two port groups, an identification code of a first port group is 21, and an identification code of a second port group is 22. Therefore, the first TRP 001 may select the smaller port group identification code 11 from the identification codes of the two port groups, that is, $Port_{DMRSGroupID}$ in the formula (2) is 11. The second TRP 002 may select the smaller port group identification code 21 from the identification codes of the two port groups, that is, $Port_{DMRSGroupID}$ in the formula (2) is 21. In addition, the first TRP 001 and the second TRP 002 may alternatively select the larger port group identification codes, namely, 12 and 22 respectively, from the port group identification codes corresponding to the first TRP 001 and the second TRP 002.

In addition, the port parameter of the DMRS may further include a parameter related to a port number of the DMRS or a port group number of the DMRS. For example, the port parameter of the DMRS may include an identifier of a layer used to map a codeword.

In one embodiment, the initial scrambling code value $c^{init}$ generated by the TRP based on the configuration parameter may be alternatively expressed as: $c_{init}=f(Port_{DMRSGroupID})$.

In addition, because the configuration parameter may include: at least one of the identification code $n_{RNTI}$ of the user equipment, the slot number $n_s$ corresponding to the resource on which the data is located, and the cell identification code $N_{ID}^{NRcell}$ the initial scrambling code value $c_{init}$ generated by the TRP based on the configuration parameter may be alternatively expressed as: $c_{init}=f(n_{RNTI}, Port_{DMRSGroupID})$, $c_{init}=f(n_{RNTI}, Port_{DMRSGroupID}, n_s)$, $c_{init}=f(n_{RNTI}, Port_{DMRSGroupID}, N_{ID}^{NRce11})$, or the like.

For example, $c_{init}=n_{RNTI} \cdot m1 + Port_{DMRSGroupID} \cdot m2 + \lfloor n_s/2 \rfloor \cdot m3$, where m1, m2, and m3 are all constants. For example, $m1=2^{p1}$, $m2=2^n$, and $m3=2^{p2}$ where p1, n, and p2 are all constants. For example, the initial scrambling code value $c_{init}$ generated by the TRP based on the configuration parameter may be expressed as: $c_{init}=f(n_{RNTI} \cdot Port_{DMRSGroupID} \cdot 2^n + \lfloor n_s/2 \rfloor \cdot 2^9)$.

In a second implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter includes a port parameter of the RS. When there is only one codeword, q is 0. When two codewords are scheduled at the same time, q is 0 or 1.

The RS may be a DMRS, a CSI-RS, a PT-RS, a TRS, or an SRS. Assuming that the RS is a DMRS, the DMRS may be an uplink DMRS or a downlink DMRS. The uplink DMRS may be a data channel DMRS or a control channel DMRS. The downlink DMRS may be a data channel DMRS or a control channel DMRS.

In one aspect, the port parameter of the DMRS may include a port number $Port_{DMRS}$ of the DMRS. The initial scrambling code value $c_{init}$ generated by the TRP based on the configuration parameter may be expressed as: $c_{init}=f(n_{RNTI}, q, Port_{DMRSGroupID}, n_s, N_{ID}^{NRce11})$.

For example, $c_{init}=n_{RNTI} \cdot m1 + q \cdot Port_{DMRS} \cdot m3 + \lfloor n_s/2 \rfloor \cdot m4 + N_{ID}^{NRce11}$, where m1, m2, m3, and m4 are all constants. For example, $m1=2^{p1}$, $m2=2^{p2}$, $m3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=n_{RNTI}\cdot 2^{14}+q\cdot 2^{13}+\text{Port}_{DMRS}\cdot 2^n+\lfloor n_s/2 \rfloor \cdot 2^9+ N_{ID}^{NRcell} \quad (3), \text{ where}$$

$n_{RNTI}$ is the identification code of the user equipment, q is the parameter used to indicate the codeword sequence number, $\text{Port}_{DMRD}$ is the port number of the DMRS, $n_s$ is the slot number corresponding to the resource on which the data is located, $\lfloor n_s/2 \rfloor$ represents a subframe number (where $\lfloor \ \rfloor$ is a rounding down symbol), and $N_{ID}^{NRcell}$ is the cell identification code.

In addition, the initial scrambling code value $c_{init}$ generated by the TRP based on the configuration parameter may be alternatively expressed as: $c_{init}=f(n_{RNTI},q,\text{Port}_{DMRS})$, $c_{init}=f(n_{RNTI},q,\text{Port}_{DMRS},n_s)$, $c_{init}=f(n_{RNTI},q,\text{Port}_{DMRS},N_{ID}^{NRcell})$, or the like.

In another aspect, the port parameter of the DMRS may include a port group identification code $\text{Port}_{DMSRGroupID}$ of the DMRS. The initial scrambling code value $c_{init}$ generated by the TRP based on the configuration parameter may be expressed as: $c_{init}=f(n_{RNTI},q,\text{Port}_{DMRSGroupID},n_s,N_{ID}^{NRcell})$.

For example, $c_{init}=n_{RNTI}\cdot m1+q\cdot m2+\text{Port}_{DMRSGroupID}\cdot m3+\lfloor n_s/2 \rfloor \cdot m4+N_{ID}^{NRcell}$, where m1, m2, m3, and m4 are all constants. For example, $m1=2^{p1}$, $m2=2^{p2}$, $m3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=n_{RNTI}\cdot 2^{14}+q\cdot 2^{13}+\text{Port}_{DMRSGroupID}\cdot 2^n+\lfloor n_s/2 \rfloor \cdot 2^9+ N_{ID}^{NRcell} \quad (4), \text{ where}$$

$n_{RNTI}$ is the identification code of the user equipment, q is the parameter used to indicate the codeword sequence number, $\text{Port}_{DMRSGroupID}$ is the port group identification code of the DMRS, $n_s$ is the slot number corresponding to the resource on which the data is located, and $N_{ID}^{NRcell}$ is the cell identification code.

Similarly, for a manner of determining $\text{Port}_{DMRS}$ in the formula (3) and $\text{Port}_{DMRSGroupID}$ in the formula (4), refer to corresponding content in the first implementable manner. Details are not described herein again.

In addition, the initial scrambling code value $c_{init}$ generated by the TRP based on the configuration parameter may be alternatively expressed as: $c_{init}=f(n_{RNTI},q,\text{Port}_{DMRSGroupID})$, $c_{init}=f(n_{RNTI},q,\text{Port}_{DMRSGroupID},n_s)$, $c_{init}=f(n_{RNTI},q,\text{Port}_{DMRSGroupID},N_{ID}^{NRcell})$, or the like.

In a third implementable manner, the configuration parameter includes: an identification code $n_{RNTI}$ of the user equipment, a slot number $n_s$ corresponding to a resource on which the data is located, a cell identification code $N_{ID}^{NRcell}$, and a target parameter, where the target parameter includes a port parameter of the RS. The port parameter of the RS may be used to indicate a port number of the RS and a port group identification code of the RS.

The RS may be a DMRS, a CSI-RS, a PT-RS, a TRS, or an SRS. Assuming that the RS is a DMRS, the port parameter of the DMRS may include a port number $\text{Port}_{DMRS}$ and a port group identification code $\text{Port}^{DMRSGroupID}$ of the DMRS. The initial scrambling code value $c_{init}$ generated by the TRP based on the configuration parameter may be expressed as: $c_{init}=f(n_{RNTI},\text{Port}_{DMRS},\text{Port}_{DMRSGroupID},n_s,N_{ID}^{NRcell})$.

For example, $c_{init}=n_{RNTI}\cdot m1+\text{Port}_{DMRS}\cdot m2+\text{Port}_{DMRSGroupID}\cdot m3+\lfloor n_s/2 \rfloor \cdot m4+N_{ID}^{NRcell}$, where m1, m2, m3, and m4 are all constants. For example, $m1=2^{p1}$, $m2=2^{n1}$, $m3=2^{n2}$, and $m4=2^{p2}$ where p1, n1, n2, and p2 are all constants.

For example, the initial scrambling code value $c_{init}$ generated by the TRP based on the configuration parameter may be expressed as:

$$c_{init}=n_{RNTI}\cdot 2^{14}+\text{Port}_{DMRS}\cdot 2^{n1}+\text{Port}_{DMRSGroupID}\cdot 2^{n2}+ \lfloor n_s/2 \rfloor \cdot 2^9+N_{ID}^{NRcell}) \quad (5), \text{ where}$$

$n_{RNTI}$ is the identification code of the user equipment, $\text{Port}_{DMRS}$ is the port number of the DMRS, $\text{Port}_{DMRSGroupID}$ is the port group identification code of the DMRS, $n_s$ is the slot number corresponding to the resource on which the data is located, and $N_{ID}^{NRcell}$ is the cell identification code. For a manner of determining $\text{Port}_{DMRS}$ and $\text{Port}_{DMRSGroupID}$ in the formula (5), refer to corresponding content in the first implementable manner.

In one embodiment, the initial scrambling code value $c_{init}$ generated by the TRP based on the configuration parameter may be alternatively expressed as: $c_{init}=f(\text{Port}_{DMRS},\text{Port}_{DMRSGroupID})$.

In addition, the initial scrambling code value $c_{init}$ generated by the TRP based on the configuration parameter may be alternatively expressed as: $c_{init}=f(n_{RNTI},\text{Port}_{DMRS},\text{Port}_{DMRSGroupID})$, $c_{init}=f(n_{RNTI},\text{port}_{DmRS},\text{Port}_{DMRSGroupID},n_s)$, $c_{init}=f(n_{RNTI},\text{Port}_{DMRS},\text{Port}_{DMRSGroupID},n_s,N_{ID}^{NRcell})$, or the like.

In a fourth implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter includes a port parameter of the RS. The port parameter of the RS may be used to indicate a port number of the RS and a port group identification code of the RS.

The RS may be a DMRS, a CSI-RS, a PT-RS, a TRS, or an SRS. Herein, an example in which the RS is a DMRS is used for description. The port parameter of the DMRS may include a port number $\text{Port}_{DMRS}$ of the DMRS and a port group identification code $\text{Port}_{DMRSGroupID}$ of the DMRS. The initial scrambling code value generated by the TRP based on the configuration parameter may be expressed as: $c_{init}=f(n_{RNTI},q,\text{Port}_{DMRS},\text{Port}_{DMRSGroupID},n_s,N_{ID}^{NRcell})$.

For example, $c_{init}=n_{RNTI}\cdot m1+q\cdot m2+\text{Port}_{DMRS}\cdot m3+\text{Port}_{DMRSGroupID}\cdot m4+\lfloor n_s/2 \rfloor \cdot m5+N_{ID}^{NRcell}$, where m1, m2, m3, m4, and m5 are all constants. For example, $m1=2^{p1}$, $m2=2^{n1}$, $m4=2^{n2}$, and $m5=2^{p3}$, where p1, p2, n1, n2, p3 are all constants.

For example, the initial scrambling code value $c_{init}$ generated by the TRP based on the configuration parameter may be expressed as:

$$c_{init}=n_{RNTI}\cdot 2^{14}+q\cdot 2^{13}+\text{Port}_{DMRS}\cdot \text{Port}_{DMRSGroupID}\cdot 2^{n2}+ \lfloor n_s/2 \rfloor \cdot 2^9+N_{ID}^{NRcell}) \quad (6), \text{ where}$$

$n_{RNTI}$ is the identification code of the user equipment, q is the parameter used to indicate the codeword sequence number, $\text{Port}_{RMRS}$ is the port number of the DMRS, $\text{Port}_{DMRSGroupID}$ is the port group identification code of the DMRS, $n_s$ is the slot number corresponding to the resource on which the data is located, and $N_{ID}^{NRcell}$ is the cell identification code. For a manner of determining $\text{Port}_{DMRS}$ and $\text{Port}_{DMRSGroupID}$ in the formula (6), refer to corresponding content in the first implementable manner.

In addition, the initial scrambling code value $c_{init}$ generated by the TRP based on the configuration parameter may be alternatively expressed as:

$c_{init}=f(n_{RNTI},q,Port_{DMRS},Port_{DMRSGroupID})$, $c_{init}=f(n_{RNTI}, q,Port_{DMRS},Port_{DMRSGroupID}, n_s)$, $c_{init}=f(n_{RNTI},q,Port_{DMRS}, Port_{DMRSGroupID}, N_{ID}^{NRcell})$, or the like.

In a fifth implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter includes a resource parameter $Re_{RS}$ of the RS. The resource parameter of the RS may be used to indicate a location of the RS in time domain and/or frequency domain.

The initial scrambling code value $c_{init}$ generated by the TRP based on the configuration parameter may be expressed as: $c_{init}=f(n_{RNTI},q,Re_{RS},n_s,N_{ID}^{NRcell})$.

For example, $c_{init}=n_{RNTI}\cdot m1+q\cdot m2+Re_{RS}\cdot m3+\lfloor n_s/2 \rfloor \cdot m4+N_{ID}^{NRcell}$, where m1, m2 m3, and m4 are all constants. For example, $m1=2^{p1}$, $m2=2^{p2}$, $m3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=n_{RNTI}\cdot 2^{14}+q\cdot 2^{13}+Re_{RS}\cdot 2^n+\lfloor n_s/2 \rfloor \cdot 2^9+N_{ID}^{NRcell} \quad (7),\text{ where}$$

$n_{RNTI}$ is the identification code of the user equipment, q is the parameter used to indicate the codeword sequence number, $Re_{RS}$ is the resource parameter of the RS, $n_s$ is the slot number corresponding to the resource on which the data is located, and $N_{ID}^{NRcell}$ is the cell identification code.

For example, the location of the RS in time domain is an identification code of a symbol occupied by the RS, and the location of the RS in frequency domain is an identification code of a subcarrier occupied by the RS.

In addition, the resource parameter $Re_{RS}$ of the RS may also include a parameter y1 related to the identification code of the symbol occupied by the RS or the identification code of the subcarrier occupied by the RS, where $y1=f1(z_{RS})$. $z_{RS}$ is the identification code of the symbol occupied by the RS or the identification code of the subcarrier occupied by the RS.

The RS may be a DMRS, a CSI-RS, a PT-RS, a TRS, or an SRS. The DMRS may be an uplink DMRS or a downlink DMRS. The uplink DMRS may be a data channel DMRS or a control channel DMRS. The downlink DMRS may be a data channel DMRS or a control channel DMRS.

The initial scrambling code value $c_{init}$ generated by the TRP based on the configuration parameter may be alternatively expressed as: $c_{init}=f(n_{RNTI},q,Re_{RS1},Re_{RS2},n_s,N_{ID}^{NRcell})$, where $Re_{RS1}$ is the location of the RS in frequency domain, and $Re_{RS2}$ is the location of the RS in time domain.

For example, $c_{init}=n_{RNTI}\cdot m1+q\cdot m2+Re_{RS1}\cdot m3+Re_{RS2}\cdot m4+\lfloor n_s/2 \rfloor \cdot m5+N_{ID}^{NRcell}$, where m1, m2, m3, m4, and m5 are all constants. For example, $m1=2^{p1}$, $m2=2^{p2}$, $m3=2^{p3}$, $m4=2^{p4}$, and $m5=2^{p5}$, where p1, p2, p3, p4, and p5 are all constants. For example, the initial scrambling code value $c_{init}$ generated by the TRP based on the configuration parameter may be expressed as:

$c_{init}=n_{RNTI}\cdot 2^{14}+q\cdot 2^{13}+Re_{RS1}\cdot 2^{13}+Re_{RS2}\cdot 2^{11}+\lfloor n_s/2 \rfloor \cdot 2^9+N_{ID}^{NRcell}$, where $Re_{RS1}$ is the identification code of the subcarrier occupied by the RS in frequency domain, and $Re_{RS2}$ is the identification code of the symbol occupied by the RS in time domain.

It should be additionally noted that the RS may correspond to a plurality of resource elements (Resource Element, RE), and each RE corresponds to one time-frequency resource location (that is, locations in time domain and frequency domain). FIG. 2-2 is a schematic diagram of an example of six REs corresponding to an RS. A time-frequency resource location corresponding to an RE 0001 is (0, 4). That is, an identification code of a subcarrier of the RE 0001 is 0, and an identification code of a symbol of the RE 0001 is 4. In other words, $Re_{RS1}$ is equal to 0, and $Re_{RS2}$ is equal to 4. The time-frequency resource location corresponding to the RE 0001 may be substituted into $c_{init}=f(n_{RNTI},q,Re_{RS1},Re_{RS2},n_s,N_{ID}^{NRcell})$. In addition, a time-frequency resource location (9, 4) corresponding to an RE 0006 may also be substituted into $c_{init}=f(n_{RNTI},q, Re_{RS1},Re_{RS2},n_s, N_{ID}^{NRcell})$ where $Re_{RS1}$ is equal to 9, and $Re_{RS2}$ is equal to 4. In addition, an operation may be performed on time-frequency resource locations of the six REs, and an operation result is substituted into $c_{init}=f(n_{RNTI},q,Re_{RS1},Re_{RS2},n_s, N_{ID}^{NRcell})$. This is not limited in this embodiment of the present invention.

In one embodiment, the initial scrambling code value $c_{init}$ generated by the TRP based on the configuration parameter may be alternatively expressed as: $c_{init}=f(Re_{RS})$.

In addition, the initial scrambling code value $c_{init}$ generated by the TRP based on the configuration parameter may be alternatively expressed as:

$c_{init}=f(n_{RNTI},q,Re_{RS})$, $c_{init}=f(n_{RNTI},q,Re_{RS},n_s)$, $c_{init}=f(n_{RNTI},q,Re_{RS}, N_{ID}^{NRcell})$, or the like.

In addition, the initial scrambling code value $c_{init}$ generated by the TRP based on the configuration parameter may be alternatively expressed as: $c_{init}=f(n_{RNTI},Re_{RS},n_s, N_{ID}^{NRcell})$.

In a sixth implementable manner, the configuration parameter includes: an identification code $n_{RNTI}$ of the user equipment, a slot number $n_s$ corresponding to a resource on which the data is located, a cell identification code $N_{ID}^{NRcell}$, and a target parameter, where the target parameter includes a beam parameter, and the beam parameter is used to indicate a beam for data transmission. For example, the beam parameter may be an identification code of the beam (that is, a number of the beam) for data transmission. Different TRPs correspond to different identification codes of the beam. In this embodiment of the present invention, the identification code of the beam is denoted as $ID_{Beam}$. The initial scrambling code value $c_{init}$ generated by the TRP based on the configuration parameter may be expressed as: $c_{init}=n_{RNTI}, ID_{Beam},n_s,N_{ID}^{NRcell})$.

For example, $c_{init}=n_{RNTI}\cdot m1+ID_{Beam}\cdot m2+\lfloor n_s/2 \rfloor \cdot m3+N_{ID}^{NRcell}$, where m1, m2, and m3 are all constants. For example, $m1=2^{p1}$), $m2=2^n$, and $m3=2^{p2}$, where p1, n, and p2 are all constants.

For example, the initial scrambling code value $c_{init}$ generated by the TRP based on the configuration parameter may be expressed as:

$$c_{init}=n_{RNTI}\cdot 2^{14}+ID_{Beam}\cdot 2^{11}+\lfloor n_s/2 \rfloor \cdot 2^9+N_{ID}^{NRcell}) \quad (8),\text{ where}$$

$n_{RNTI}$ is the identification code of the user equipment, $ID_{Beam}$ is the identification code of the beam, $n_s$ is the slot number corresponding to the resource on which data is located, and $N_{ID}^{NRcell}$ is the cell identification code.

In this embodiment of the present invention, when data is transmitted by using a beam, an initial scrambling code value may be generated based on an identification code of the beam.

In addition, the beam parameter may be alternatively a parameter related to the identification code of the beam, such as a slot parameter or a frequency band parameter.

In one embodiment, the initial scrambling code value $c_{init}$ generated by the TRP based on the configuration parameter may be alternatively expressed as: $c_{init}=f(ID_{Beam})$.

In addition, the initial scrambling code value $c_{init}$ generated by the TRP based on the configuration parameter may be alternatively expressed as:

$c_{init}=f(n_{RNTI}, ID_{Beam})$, $c_{init}=f(n_{RNTI}, ID_{Beam},n_s)$, $c_{init}=f(n_{RNTI}, ID_{Beam},N_{ID}^{NRcell})$, or the like.

In a seventh implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter includes a beam parameter. For example, the beam parameter may be an identification code $ID_{Beam}$ of the beam for data transmission. Different TRPs correspond to different identification codes of the beam. The initial scrambling code value $c_{init}$ generated by the TRP based on the configuration parameter may be expressed as: $c_{init}=f(n_{RNTI},q, ID_{Beam},n_s,N_{ID}^{NRcell})$.

For example, $c_{init}=n_{RNTI}\cdot m1+q\cdot m2+ID_{Beam}\cdot m3+\lfloor n_s/2 \rfloor \cdot m4+N_{ID}^{NRcell}$, where m1, m2, m3, and m4 are all constants. For example, $m1=2^{p1}$, $m2=2^{p2}$, $m3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=n_{RNTI}\cdot 2^{14}+q\cdot 2^{13}+ID_{Beam}\cdot 2^n+\lfloor n_s/2 \rfloor \cdot 2^9+N_{ID}^{NRcell} \quad (9), \text{ where}$$

$n_{RNTI}$ is the identification code of the user equipment, q is the parameter used to indicate the codeword sequence number, $ID_{Beam}$ is the identification code of the beam, $n_s$ is the slot number corresponding to the resource on which the data is located, and $N_{ID}^{NRcell}$ is the cell identification code.

In addition, the initial scrambling code value $c_{init}$ generated by the TRP based on the configuration parameter may be alternatively expressed as:

$c_{init}=f(n_{RNTI},q,ID_{Beam})$, $c_{init}=f(n_{RNTI},q,ID_{Beam},n_s)$, $c_{init}=f(n_{RNTI},q,ID_{Beam},N_{ID}^{NRcell})$, or the like.

In an eighth implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter is a first identification code allocated to the TRP, and the first identification code is used to generate the initial scrambling code value. In this embodiment of the present invention, the first identification code is denoted as p. The initial scrambling code value $c_{init}$ generated by the TRP based on the configuration parameter may be expressed as: $c_{init}=f(n_{RNTI},q,n_s,N_{ID}^{NRcell})$.

For example, $c_{init}=n_{RNTI}\cdot m1+q\cdot m2+p\cdot m3+\lfloor n_s/2 \rfloor \cdot m4+N_{ID}^{NRcell}$, where m1, m2, m3, and m4 are all constants. For example, $m1=2^{p1}$, $m2=2^{p2}$, $m3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=n_{RNTI}\cdot 2^{14}+q\cdot 2^{13}+p\cdot 2^n+\lfloor n_s/2 \rfloor \cdot 2^9+N_{ID}^{NRcell} \quad (10), \text{ where}$$

$n_{RNTI}$ is the identification code of the user equipment, q is the parameter used to indicate the codeword sequence number, p is the first identification code allocated to the TRP, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(p)$.

In addition, the initial scrambling code value $c_{init}$ generated by the TRP based on the configuration parameter may be alternatively expressed as:

$c_{init}=f(n_{RNTI},q,p)$, $c_{init}=f(n_{RNTI},q,p,n_s)$, $c_{init}=f(n_{RNTI},q,p,N_{ID}^{NRcell})$, or the like.

In this implementable manner, the obtaining, by the TRP, the target parameter may include: receiving, by the TRP, the first identification code sent by a network side device. The network side device is configured to manage the TRP. The network side device allocates different first identification codes to different TRPs. For example, in FIG. 1, a first identification code allocated by the network side device to the first TRP 001 is 3, and a first identification code allocated by the network side device to the second TRP 002 is 4. Because different first identification codes are allocated to different TRPs, initial scrambling code values generated by the different TRPs based on configuration parameters are different.

Correspondingly, after the receiving, by the TRP, the first identification code sent by the network side device, the method may further include: sending, by the TRP, the first identification code to the user equipment. For example, in FIG. 1, the first TRP 001 sends the first identification code 3 to the user equipment 30, and the second TRP 002 sends the first identification code 4 to the user equipment 30, so that the user equipment obtains a scrambling code sequence, and descrambles the received data by using the scrambling code sequence. For example, the TRP may send the first identification code to the user equipment by using a control channel. After receiving the first identification code, the user equipment generates the initial scrambling code value based on the configuration parameter, and then obtains, based on the initial scrambling code value, the scrambling code sequence used for descrambling.

It should be additionally noted that when the user equipment is a data transmit end and the TRP is a data receive end, alternatively, the TRP may receive the first identification code sent by the network side device, generate the initial scrambling code value based on the configuration parameter, and then obtain, based on the initial scrambling code value, a scrambling code sequence used for descrambling. After receiving the first identification code sent by the network side device, the TRP similarly sends the first identification code to the user equipment, so that the user equipment generates the initial scrambling code value. Then, the user equipment obtains, based on the initial scrambling code value, the scrambling code sequence used for scrambling.

In a ninth implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter is a second identification code pre-allocated to the TRP. The second identification code is used to indicate the TRP. In this embodiment of the present invention, the second identification code is denoted as $N_{ID}^{TRP}$. The initial scrambling code value $c_{init}$ generated by the TRP based on the configuration parameter may be expressed as: $c_{init}=f(n_{RNTI},q,N_{ID}^{TRP},n_s,N_{ID}^{NRcell})$.

For example, $c_{init}=f(n_{RNTI}\cdot m1+q\cdot m2+N_{ID}^{TRP}\cdot m3+\lfloor n_s/2 \rfloor \cdot m4+N_{ID}^{NRcell}$, where m1, m2, m3, and m4 are all constants. For example, $m1=2^{p1}$, $m2=2^{p2}$, $m3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=f(n_{RNTI} \cdot 2^{14}+q \cdot 2^{13}+N_{ID}^{TRP} \cdot 2^n+\lfloor n_s/2 \rfloor \cdot 2^9+ N_{ID}^{NRcell}) \quad (11), \text{ where}$$

$n_{RNTI}$ is the identification code of the user equipment, q is the parameter used to indicate the codeword sequence number, $N_{ID}^{TRP}$ is the second identification code, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(N_{ID}^{TRP})$.

In addition, the initial scrambling code value $c_{init}$ generated by the TRP based on the configuration parameter may be alternatively expressed as: $c_{init}=f(n_{RNTI},q,N_{ID}^{TRP})$, $c_{init}=f(n_{RNTI},q,N_{ID}^{TRP},n_s)$, $c_{init}=f(n_{RNTI},q,N_{ID}^{TRP},N_{ID}^{NRcell})$, or the like.

In this implementable manner, the obtaining, by the TRP, the target parameter may include: obtaining, by the TRP, the pre-allocated second identification code. Second identification codes $N_{ID}^{TRP}$ pre-allocated to different TRPs are different. For example, in FIG. 1, a second identification code pre-allocated to the first TRP 001 is 5, and a second identification code pre-allocated to the second TRP 002 is 6. Because second identification codes pre-allocated to different TRPs are different, initial scrambling code values generated by the different TRPs based on configuration parameters are different. For a process of allocating the second identification code $N_{ID}^{TRP}$ to the TRP, refer to a related technology.

Correspondingly, after the obtaining the pre-allocated second identification code, the method may further include: sending the second identification code to the user equipment. For example, in FIG. 1, the first TRP 001 sends the second identification code 5 to the user equipment 30, and the second TRP 002 sends the second identification code 6 to the user equipment 30. To enable the user equipment to obtain a scrambling code sequence and descramble the received data by using the scrambling code sequence, after obtaining the pre-allocated second identification code, the TRP sends the second identification code to the user equipment. For example, the TRP may send the second identification code to the user equipment by using a control channel. After receiving the second identification code, the user equipment generates the initial scrambling code value based on the configuration parameter, and then obtains, based on the initial scrambling code value, the scrambling code sequence used for descrambling.

It should be additionally noted that when the user equipment is a data transmit end and the TRP is a data receive end, alternatively, the TRP may obtain the pre-allocated second identification code, generate the initial scrambling code value based on the configuration parameter, and then obtain, based on the initial scrambling code value, the scrambling code sequence used for descrambling. After obtaining the pre-allocated second identification code, the TRP similarly sends the second identification code to the user equipment, so that the user equipment generates the initial scrambling code value. Then, the user equipment obtains, based on the initial scrambling code value, the scrambling code sequence used for scrambling.

In a tenth implementable manner, identification codes allocated by different TRPs to the user equipment are different. In one embodiment, the configuration parameter may include: an identification code UEid of the user equipment, a slot number $n_s$ corresponding to a resource on which the data is located, a parameter q used to indicate a codeword sequence number, and a cell identification code $N_{ID}^{NRcell}$. The initial scrambling code value $c_{init}$ generated by the TRP based on the configuration parameter may be expressed as: $c_{init}=f(UEid,q,n_s,N_{ID}^{NRcell})$.

For example, $c_{init}=UEid \cdot m1+q \cdot m2+\lfloor n_s/2 \rfloor \cdot m3+N_{ID}^{NRcell}$, where m1, m2, and m3 are all constants. For example, $m1=2^{p1}$, $m2=2^{p2}$ and $m3=2^{p3}$, where p1, p2, and p3 are all constants.

For example, the initial scrambling code value $c_{init}$ generated by the TRP based on the configuration parameter may be expressed as:

$$c_{init}=UEid \cdot 2^{14}+q \cdot 2^{13}\lfloor n_s/2 \rfloor \cdot 2^9+N_{ID}^{NRcell} \quad (12), \text{ where}$$

UEid is the identification code of the user equipment, q is the parameter used to indicate the codeword sequence number, $n_s$ is the slot number corresponding to the resource on which the data is located, and $N_{ID}^{NRcell}$ ID is the cell identification code.

In addition, the initial scrambling code value $c_{init}$ generated by the TRP based on the configuration parameter may be alternatively expressed as: $c_{init}=(UEid,q)$ $c_{init}=f(UEid,q,n_s)$, $c_{init}=f(UEd,q,N_{ID}^{NRcell})$, or the like.

In this implementable manner, the TRP obtains the identification code UEid allocated to the user equipment. Identification codes allocated by different TRPs to the user equipment are different. For example, in FIG. 1, an identification code allocated by the first TRP 001 to the user equipment 30 is 7, and an identification code allocated by the second TRP 002 to the user equipment 30 is 8. Because identification codes allocated by different TRPs to the user equipment are different, initial scrambling code values generated by the different TRPs are different.

To enable different TRPs to allocate different identification codes to the user equipment, for example, identification code ranges may be allocated in advance to different TRPs, and the identification code ranges allocated to the different TRPs in advance are different. Alternatively, different TRPs may randomly generate identification codes by using different hash functions, and then allocate the generated identification codes to the user equipment.

For example, in FIG. 1, an identification code range pre-allocated to the first TRP 001 is 100 to 200, and an identification code range pre-allocated to the second TRP 001 is 300 to 400. In this case, the first TRP 001 selects an identification code 150 from the range of 100 to 200, and allocates the identification code 150 to the user equipment 30. The second TRP 002 selects an identification code 370 from the range of 300 to 400, and allocates the identification code 370 to the user equipment 30. This ensures that the first TRP 001 and the second TRP 002 allocate different identification codes to the user equipment 30. Alternatively, the first TRP 001 generates an identification code by using a hash function, and allocates the identification code to the user equipment 30. The second TRP 002 generates an identification code by using another hash function, and allocates the identification code to the user equipment 30. Finally, the first TRP 001 and the second TRP 002 generate different identification codes.

When the method is applied to user equipment, the user equipment is a data receive end. The obtaining, by the user equipment, the identification code of the user equipment may include: obtaining an identification code allocated by the TRP to the user equipment in an uplink access process. For example, in FIG. 1, the user equipment 30 obtains the identification code 150 allocated by the first TRP 001 to the user equipment 30 in an uplink access process, and the user equipment 30 obtains the identification code 370 allocated by the second TRP 002 to the user equipment 30 in an uplink access process.

It should be additionally noted that when the user equipment is a data transmit end and the TRP is a data receive end, alternatively, the TRP may obtain the identification code allocated to the user equipment, generate the initial scrambling code value, and then obtain, based on the initial scrambling code value, a scrambling code sequence used for descrambling. Similarly, the user equipment obtains the identification code allocated by the TRP to the user equipment in the uplink access process, generates the initial scrambling code value based on the identification code allocated by the TRP to the user equipment, and obtains, based on the initial scrambling code value, the scrambling code sequence used for scrambling.

In one embodiment, the first item $n_{RNTI} \cdot 2^{14}$ in the formula (1) to the formula (11) may be replaced with $UEid \cdot 2^{14}$ in this implementable manner.

In an eleventh implementable manner, the configuration parameter includes: an identification code $n_{RNTI}$ of the user equipment, a slot number $n_s$ corresponding to a resource on which the data is located, a cell identification code $N_{ID}^{NRcell}$, and a target parameter, where the target parameter may include a port parameter of the RS and a first identification code p allocated to the TRP.

Assuming that the RS is a DMRS, in one embodiment, the port parameter of the DMRS includes a port number $Port_{DMRS}$ of the DMRS. The initial scrambling code value $c_{init}$ generated by the TRP based on the configuration parameter may be expressed as: $c_{init}=f(n_{RNTI},p,Port_{DMRS},n_s,N_{ID}^{NRcell})$.

For example, $c_{init}=f(n_{RNTI} \cdot m1+p \cdot m2+Port_{DMRS} \cdot m3+\lfloor n_s/2 \rfloor \cdot m4+N_{ID}^{NRcell})$, where m1, m2, m3, and m4 are all constants. For example, $m1=2^{p1}$, $m2=2^n$, $m3=2^{p2}$, and $m4=2^{p3}$, where p1, n, p2, and p3 are all constants.

For example, the initial scrambling code value $c_{init}$ generated by the TRP based on the configuration parameter may be expressed as:

$$c_{init}=n_{RNTI} \cdot 2^{14}+p \cdot 2^n+Port_{DMRS} \cdot 2^{13}+\lfloor n_s/2 \rfloor \cdot 2^9+N_{ID}^{NRcell} \quad (13)$$

where $n_{RNTI}$ is the identification code of the user equipment, p is the first identification code allocated to the TRP, $Port_{DMRS}$ is the port number of the DMRS, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(p,Port_{DMRS})$.

In addition, the initial scrambling code value $c_{init}$ generated by the TRP based on the configuration parameter may be alternatively expressed as:
$c_{init}=f(n_{RNTI},p,Port_{DMRS})$, $c_{init}=f(n_{RNTI},p,Port_{DMRS},n_s)$, $c_{init}=f(n_{RNTI},p,Port_{DMRS},N_{ID}^{NRcell})$, or the like.

In one embodiment, the port parameter of the DMRS includes a port group identification code $Port_{DMRSGroupID}$ of the DMRS. The initial scrambling code value $c_{init}$ generated by the TRP based on the configuration parameter may be expressed as: $c_{init}=f(n_{RNTI},p,Port_{DMRSGroupID},n_s,N_{ID}^{NRcell})$.

For example, $c_{init}=f(n_{RNTI} \cdot m1+p \cdot m2+Port_{DMRSGroupID} \cdot m3+\lfloor n_s/2 \rfloor \cdot m4+N_{ID}^{NRcell})$, where m1, m2, m3, and m4 are all constants. For example, $m1=2^{p1}$, $m2=2^n$, $m3=2^{p2}$, and $m4=2^{p3}$, where p1, n, p2, and p3 are all constants.

For example, the initial scrambling code value $c_{init}$ generated by the TRP based on the configuration parameter may be expressed as:

$$c_{init}=n_{RNTI} \cdot 2^{14}+p \cdot 2^n+Port_{DMRSGroupOID} \cdot 2^{13}+\lfloor n_s/2 \rfloor \cdot 2^9+N_{ID}^{NRcell} \quad (14)$$

where $n_{RNTI}$ is the identification code of the user equipment, p is the first identification code allocated to the TRP, $Port_{DMRSGroupID}$ is the port group identification code of the DMRS, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(p,Port_{DMRSGroupID})$.

In addition, the initial scrambling code value $c_{init}$ generated by the TRP based on the configuration parameter may be alternatively expressed as: $c_{init}=f(n_{RNTI},p,Port_{DMRSGroupID})$, $c_{init}=f(n_{RNTI},p,Port_{DMRSGroupID},n_s)$, $c_{init}=f(n_{RNTI},p,Port_{DMRSGroupID},N_{ID}^{NRcell})$, or the like.

Further, the target parameter may further include a resource parameter of the RS. For the resource parameter of the RS, refer to corresponding content in the fifth implementable manner.

In a twelfth implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter includes a port parameter of the RS and a first identification code p allocated to the TRP.

Assuming that the RS is a DMRS, in one embodiment, the port parameter of the DMRS includes a port number $Port_{DMRS}$ of the DMRS. The initial scrambling code value $c_{init}$ generated by the TRP based on the configuration parameter may be expressed as: $c_{init}=f(n_{RNTI},q,p,Port_{DMRS},n_s,N_{ID}^{NRcell})$.

For example, $c_{init}=n_{RNTI} \cdot m1+q \cdot m2+p \cdot m3+Port_{DMRS} \cdot m4+\lfloor n_s/2 \rfloor \cdot m5+N_{ID}^{NRcell}$, where m1, m2, m3, m4, and m5 are all constants. For example, $m1=2^{p1}$, $m2=2^{p2}$, $m3=2^{n1}$, $m4=2^{n2}$, and $m5=2^{p3}$, where p1, p2, n1, n2, and p3 are all constants.

For example, the initial scrambling code value $c_{init}$ generated by the TRP based on the configuration parameter may be expressed as:

$$c_{init}=n_{RNTI} \cdot 2^{14}+q \cdot 2^{13}+p \cdot 2^{n1}+Port_{DMRS} \cdot 2^{n2}+\lfloor n_s/2 \rfloor \cdot 2^9+N_{ID}^{NRcell} \quad (15)$$

where $n_{RNTI}$ is the identification code of the user equipment, q is the parameter used to indicate the codeword sequence number, p is the first identification code, $Port_{DMRS}$ is the port number of the DMRS, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(q,p,Port_{DMRS})$.

In addition, the initial scrambling code value $c_{init}$ generated by the TRP based on the configuration parameter may be alternatively expressed as:
$c_{init}=f(n_{RNTI},q,p,Port_{DMRS})$, $c_{init}=f(n_{RNTI},q,p,Port_{DMRS})$, $c_{init}=f(n_{RNTI},q,p,Port_{DMRSGroupID},N_{ID}^{NRcell})$, or the like.

In one embodiment, the port parameter of the DMRS includes a port group identification code $Port_{DMRSGroupID}$ of the DMRS. The initial scrambling code value $c_{init}$ generated by the TRP based on the configuration parameter may be expressed as: $c_{init}=f(n_{RNTI},q,p,Port_{DMRSGroupID},n_s,N_{ID}^{NRcell})$.

For example, $c_{init}=n_{RNTI} \cdot m1+q \cdot m2+p \cdot m3+Port_{DMRSGroupID} \cdot m4+\lfloor n_s/2 \rfloor \cdot m5+N_{ID}^{NRcell}$, where m1, m2, m3, m4, and m5 are all constants. For example, $m1=2^{p1}$, $m2=2^{p2}$, $m3=2^{n1}$, $m4=2^{n2}$, and $m5=2^{p3}$, where p1, p2, n1, n2, and p3 are all constants.

For example, the initial scrambling code value $c_{init}$ generated by the TRP based on the configuration parameter may be expressed as:

$$c_{init}=n_{RNTI} \cdot 2^{14}+q \cdot 2^{13}+p \cdot 2^{n1}+Port_{DMRSGroupID} \cdot 2^{n2}+\lfloor n_s/2 \rfloor \cdot 2^9 + N_{ID}^{NRcell} \quad (16)$$

where $n_{RNTI}$ is the identification code of the user equipment, q is the parameter used to indicate the codeword sequence number, p is the first identification code, $Port_{DMRSGroupID}$ is the port group identification code of the DMRS, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(q,p,Port_{DMRSGroupID})$.

In addition, the initial scrambling code value $c_{init}$ generated by the TRP based on the configuration parameter may be alternatively expressed as: $c_{init}=f(n_{RNTI},q,p,Port_{DMRSGroupID})$, $c_{init}=f(n_{RNTI},q,p,Port_{DMRSGroupID},n_s)$, $c_{init}=f(n_{RNTI},q,p,Port_{DMRSGroupID},N_{ID}^{NRcell})$, or the like.

Further, the target parameter may further include a resource parameter of the RS.

In a thirteenth implementable manner, the configuration parameter includes: an identification code $n_{RNTI}$ of the user equipment, a slot number $n_s$ corresponding to a resource on which the data is located, a cell identification code $N_{ID}^{NRcell}$, and a target parameter, where the target parameter includes a port parameter of the RS and a second identification code $N_{ID}^{NRcell}$ pre-allocated to the TRP.

Assuming that the RS is a DMRS, in one embodiment, the port parameter of the DMRS includes a port number $Port_{DMRS}$ of the DMRS. The initial scrambling code value $c_{init}$ generated by the TRP based on the configuration parameter may be expressed as: $c_{init}=f(n_{RNTI},Port_{DMRS},N_{ID}^{TRP},n_s,N_{ID}^{NRcell})$.

For example, $c_{init}=n_{RNTI} \cdot m1+Port_{DMRS} \cdot m2+N_{ID}^{TRP} \cdot m3+\lfloor n_s/2 \rfloor \cdot m4+N_{ID}^{NRcell}$, where m1, m2, m3, and m4 are all constants. For example, $m1=2^{p1}$, $m2=2^{p2}$, $m3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=n_{RNTI} \cdot 2^{14}+Port_{DMRS} \cdot 2^{13}+N_{ID}^{TRP} \cdot 2^n+\lfloor n_s/2 \rfloor \cdot 2^9+N_{ID}^{NRcell} \quad (17)$$

where $n_{RNTI}$ is the identification code of the user equipment, $Port_{DMRS}$ is the port number of the DMRS, $N_{ID}^{TRP}$ is the second identification code pre-allocated to the TRP, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(Port_{DMRS},N_{ID}^{TRP})$.

In addition, the initial scrambling code value $c_{init}$ generated by the TRP based on the configuration parameter may be alternatively expressed as:
$c_{init}=f(n_{RNTI},Port_{DMRS})$, $c_{init}=f(n_{RNTI},Port_{DMRS},N_{ID}^{TRP},n_s)$, $c_{init}=f(n_{RNTI},Port_{DMRS},N_{ID}^{TRP},N_{ID}^{NRcell})$, or the like.

In one embodiment, the port parameter of the DMRS includes a port group identification code $Port_{DMRSGroupID}$ of the DMRS. The initial scrambling code value $c_{init}$ generated by the TRP based on the configuration parameter may be expressed as: $c_{init}=f(n_{RNTI},Port_{DMRSGroupID},N_{ID}^{TRP},N_{ID}^{NRcell})$.

For example, $c_{init}=n_{RNTI} \cdot m1+Port_{DMRSGroupID} \cdot m2+N_{ID}^{TRP} \cdot m3+\lfloor n_s/2 \rfloor \cdot m4+N_{ID}^{NRcell}$, where m1, m2, m3, and m4 are all constants. For example, $m1=2^{p1}$, $m2=2^{n1}$, $m3=2^{n2}$ and $m4=2^{p2}$, where p1, n1, n2, and p2 are all constants.

For example, the initial scrambling code value $c_{init}$ generated by the TRP based on the configuration parameter may be expressed as:

$$c_{init}=n_{RNTI} \cdot 2^{14}+Port_{DMRSGroupID} \cdot 2^{n1}+N_{ID}^{TRP} \cdot 2^{n2}+\lfloor n_s/2 \rfloor \cdot 2^9+N_{ID}^{NRcell} \quad (18)$$

where $n_{RNTI}$ is the identification code of the user equipment, $Port_{DMRSGroupID}$ is the port group identification code of the DMRS, $N_{ID}^{NTRP}$ is the second identification code pre-allocated to the TRP, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(Port_{DMRSGroupID},N_{ID}^{TRP})$.

In addition, the initial scrambling code value $c_{init}$ generated by the TRP based on the configuration parameter may be alternatively expressed as:
$c_{init}=f(n_{RNTI},Port_{DMRSGroupID},N_{ID}^{TRP})$, $c_{init}=f(n_{RNTI},Port_{DMRSGroupID},N_{ID}^{TRP},n_s)$, $c_{init}=f(n_{RNTI},Port_{DMRSGroupID},N_{ID}^{TRP},N_{ID}^{NRcell})$, or the like.

In a fourteenth implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter includes a port parameter of the RS and a second identification code $N_{ID}^{TRP}$ pre-allocated to the TRP.

Assuming that the RS is a DMRS, in one embodiment, the port parameter of the DMRS includes a port number $Port_{DMRS}$ of the DMRS. The initial scrambling code value $c_{init}$ generated by the TRP based on the configuration parameter may be expressed as: $c_{init}=n_{RNTI},q,Port_{DMRS},N_{ID}^{TRP},n_s,N_{ID}^{NRcell})$.

For example $c_{init}=n_{RNTI} \cdot m1+q \cdot m2+Port_{DMRS} \cdot m3+N_{ID}^{TRP} \cdot m4+\lfloor n_s/2 \rfloor \cdot m5+N_{ID}^{NRcell}$, where m1, m2, m3, m4, and m5 are all constants. For example, $m1=2^{p1}$, $m2=2^{p2}$, $m3=2^{n1}$, $m4=2^{n2}$, and $m5=2^{p3}$, where p1, p2, n1, n2, and p3 are all constants.

For example, the initial scrambling code value $c_{init}$ generated by the TRP based on the configuration parameter may be expressed as:

$$c_{init}=n_{RNTI} \cdot 2^{14}+q \cdot 2^{13}+Port_{DMRS} \cdot 2^{n1}+N_{ID}^{TRP} \cdot 2^{n2}+\lfloor n_s/2 \rfloor \cdot 2^9+N_{ID}^{NRcell} \quad (19)$$

where $n_{RNTI}$ is the identification code of the user equipment, q is the parameter used to indicate the codeword sequence number, $Port_{DMRS}$ is the port number of the DMRS, $N_{ID}^{TRP}$ is the second identification code pre-allocated to the TRP, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(q,Port_{DMRS},N_{ID}^{TRP})$.

In addition, the initial scrambling code value $c_{init}$ generated by the TRP based on the configuration parameter may be alternatively expressed as:

$c_{init}=f(n_{RNTI},q,Port_{DMRS},N_{ID}^{TRP})$, $c_{init}=f(n_{RNTI},q,Port_{DMRS},N_{ID}^{TRP},n_s)$, $c_{init}=f(n_{RNTI},q,Port_{DMRS},N_{ID}^{TRP},N_{ID}^{NRcell})$, or the like.

In one embodiment, the port parameter of the DMRS includes a port group identification code $Port_{DMRSGroupID}$ of the DMRS. The initial scrambling code value $c_{init}$ generated by the TRP based on the configuration parameter may be expressed as: $c_{init}=f(n_{RNTI},Port_{DMRSGroupID},N_{ID}^{TRP},n_s,N_{ID}^{NRcell})$.

For example, $c_{init}=n_{RNTI}\cdot m1+q\cdot m2+Port_{DMRSGroupID}\cdot m3+N_{ID}^{TRP}\cdot m4+\lfloor n_s/2\rfloor\cdot m5+N_{ID}^{NRcell}$, where m1, m2, m3, m4, and m5 are all constants. For example, $m1=2^{p1}$, $m2=2^{p2}$, $m3=2^{n1}$, $m4=2^{n2}$, and $m5=2^{p3}$, where p1, p2, n1, n2, and p3 are all constants.

For example, the initial scrambling code value $c_{init}$ generated by the TRP based on the configuration parameter may be expressed as:

$$c_{init}=n_{RNTI}\cdot 2^{14}+q\cdot 2^{13}+Port_{DMRSGroupID}\cdot 2^{n1}+N_{ID}^{TRP}\cdot 2^{n2}+\lfloor n_s/2\rfloor\cdot 2^9+N_{ID}^{NRcell} \quad (20)$$

where $n_{RNTI}$ is the identification code of the user equipment, q is the parameter used to indicate the codeword sequence number, $Port_{DMRSGroupID}$ is the port group identification code of the DMRS, $N_{ID}^{TRP}$ is the second identification code pre-allocated to the TRP, $n_s$ is the slot number corresponding to the resource on which the data is located, and $N_{ID}^{NRcell}$ is the cell identification code.

In one embodiment, the initial scrambling code value $c_{init}$ generated by the TRP based on the configuration parameter may be alternatively expressed as: $c_{init}=f(q,Port_{DMRSGroupID},N_{ID}^{TRP})$.

In addition, the initial scrambling code value $c_{init}$ generated by the TRP based on the configuration parameter may be alternatively expressed as:

$c_{init}=f(n_{RNTI},q,Port_{DMRSGroupID},N_{ID}^{TRP})$, $c_{init}=f(n_{RNTI},q,Port_{DMRSGroupID},N_{ID}^{TRP},n_s)$, $c_{init}=f(n_{RNTI},q,Port_{DMRSGroupID},N_{ID}^{TRP},N_{ID}^{NRcell})$, or the like.

In one embodiment, the first item $n_{RNTI}$ in the formula (13) to the formula (20) may be replaced with UEid in the tenth implementable manner.

In a fifteenth implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter includes a parameter $Para_{Syn}$ related to a synchronization signal.

The initial scrambling code value $c_{init}$ generated by the TRP based on the configuration parameter may be expressed as: $c_{init}=f(n_{RNTI},q,Para_{Syn},n_s,N_{ID}^{NRcell})$.

For example, $c_{init}=f(n_{RNTI}\cdot m1+q\cdot m2+Para_{Syn}\cdot m3+\lfloor n_s/2\rfloor\cdot m4+N_{ID}^{NRcell})$, where m1, m2, m3, and m4 are all constants. For example, $m1=2^{p2}$, $m2=2^{p2}$, $m3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=f(n_{RNTI}\cdot 2^{14}+q\cdot 2^{13}+Para_{Syn}\cdot 2^n+\lfloor n_s/2\rfloor\cdot 2^9+N_{ID}^{NRcell}) \quad (21)$$

where $n_{RNTI}$ is the identification code of the user equipment, q is the parameter used to indicate the codeword sequence number, $Para_{Syn}$ is the parameter related to the synchronization signal, $n_s$ is the slot number corresponding to the resource on which the data is located, and $N_{ID}^{NRcell}$ is the cell identification code.

For example, the synchronization signal may be a PSS, an SSS, or a PRACH signal.

In one embodiment, the parameter related to the synchronization signal may include at least one of a preset parameter used to instruct to determine a synchronization signal sequence, a resource parameter of the synchronization signal, and a port parameter of the synchronization signal. The preset parameter is a root sequence parameter, a cyclic shift parameter, or a scrambling parameter.

For example, the parameter $Para_{Syn}$ related to the synchronization signal may include a preset parameter $f_c$, and the preset parameter is a root sequence (that is, a ZC (Zadoff-Chu) root sequence) parameter, a cyclic shift parameter, or a scrambling parameter. For example, it is directly determined, by using a root sequence, that a root sequence parameter corresponding to a synchronization signal sequence is 1; after the root sequence is cyclically shifted, it is determined that a cyclic shift parameter corresponding to the synchronization signal sequence is 2; and after the root sequence is cyclically shifted and scrambled, it is determined that a scrambling parameter corresponding to the synchronization signal sequence is 3. Therefore, when determining different preset parameters of synchronization signal sequences, different TRPs may generate initial scrambling code values based on corresponding preset parameters. In addition, the parameter $Para_{Syn}$ related to the synchronization signal) may further include a parameter y2 related to the preset parameter, where $y2=f2(f_c)$.

For example, the parameter $Para_{Syn}$ related to the synchronization signal may alternatively include a sending sequence number of an SS block of the synchronization signal or a sending sequence number of an uplink RACH occasion.

Generally, for a downlink synchronization signal, the TRP continuously sends a plurality of SS blocks in time domain, where each SS block has a sending sequence number. Assuming that the TRP continuously sends four SS blocks, a sending sequence number corresponding to the first sent SS block is 1, a sending sequence number corresponding to the second sent SS block is 2, a sending sequence number corresponding to the third sent SS block is 3, and a sending sequence number corresponding to the fourth sent SS block is 4. Therefore, when sending sequence numbers of SS blocks sent by different TRPs are different, initial scrambling code values may be generated based on the sending sequence numbers of the SS blocks. However, for an uplink synchronization signal, the TRP continuously sends a plurality of RACH occasions in time domain, where each RACH occasion has a sending sequence number. Therefore, when sending sequence numbers of RACH occasions sent by different TRPs are different, initial scrambling code values may be generated based on the sending sequence numbers of the RACH occasions. For example, the configuration parameter includes: an identification code $n_{RNTI}$ of the user equipment, a slot number $n_s$ corresponding to a resource on which data of a data transmission service is located, a cell identification code $N_{ID}^{NRcell}$, a parameter q used to indicate a codeword sequence number, and a target parameter, where the target parameter includes a sending sequence number c1 of an SS block.

The initial scrambling code value $c_{init}$ generated by the TRP based on the configuration parameter may be expressed as: $c_{init}=f(n_{RNTI},q,c1,n_s,N_{ID}^{NRcell})$. For example, $c_{init}=n_{RNTI}\cdot m1+q\cdot m2+c1\cdot m3+\lfloor n_s/2\rfloor\cdot m4+N_{ID}^{NRcell}$, where m1, m2, m3, and m4 are all constants. For example, $m1=2^{p1}$, $m2=2^{p2}$, $m3=2^n$ and $m4=2^{p3}$, where p1, p2, n, and p3 are all constants. For example, the initial scrambling code value $c_{init}$ generated by the TRP based on the configuration parameter may be expressed as: $c_{init}=n_{RNTI} \cdot 2^{14}+q \cdot 2^{13}+c1 \cdot 2^{n}+\lfloor n_s/2 \rfloor \cdot 2^9+N_{ID}^{NRcell}$.

Figures 2, 3:
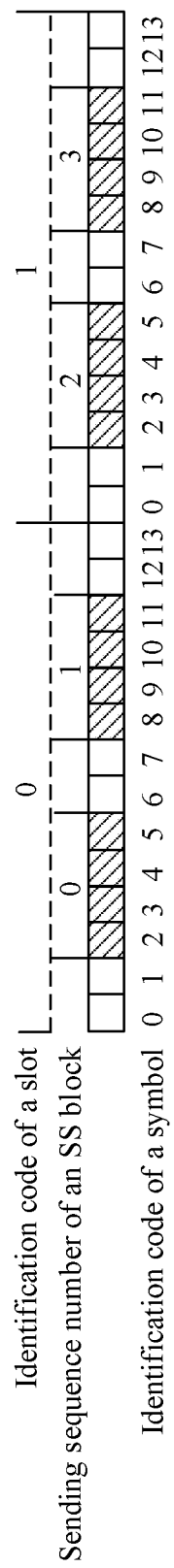
Figures 1, 3:
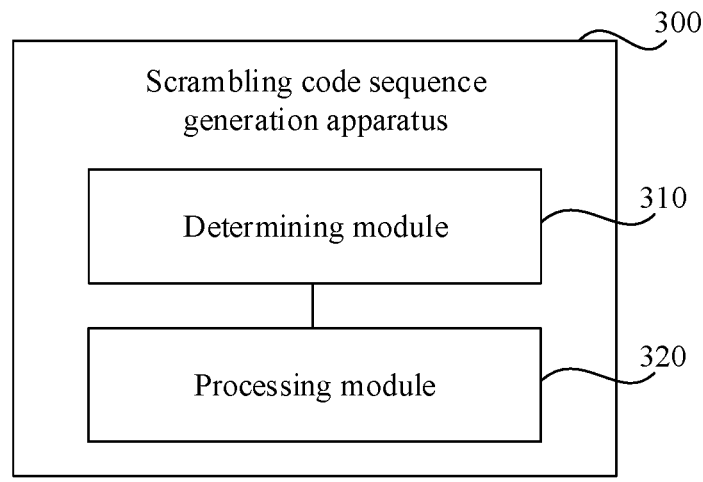
Figures 2, 3:
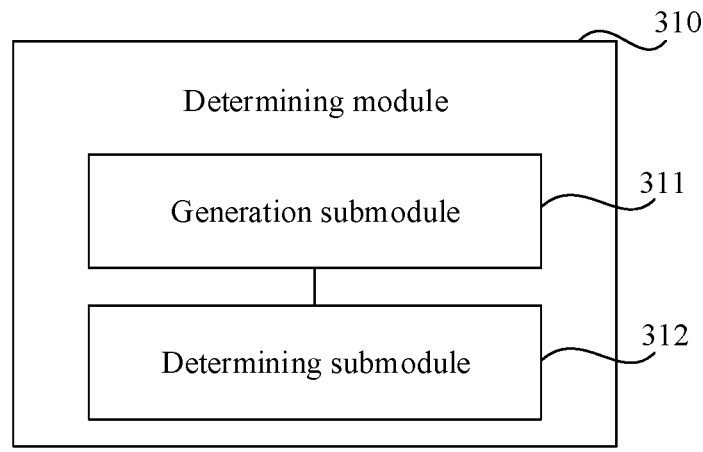

FIG. 2-3 is a schematic diagram of an example of a sending sequence of an SS block. As shown in FIG. 2-3, the TRP continuously sends four SS blocks. A sending sequence number corresponding to the first sent SS block is 0, a sending sequence number corresponding to the second SS block is 1, a sending sequence number corresponding to the third SS block is 2, and a sending sequence number corresponding to the fourth SS block is 3. A quantity of symbols occupied by each SS block is 4, and a slot occupied by the first two SS blocks is different from that occupied by the last two SS blocks. For example, the sending sequence number 1 corresponding to the second SS block may be substituted into $c_{init}=f(n_{RNTI},q,c1,n_s,N_{ID}^{NRcell})$, where c1 is equal to 1. Alternatively, the sending sequence number 3 corresponding to the fourth SS block may be substituted into $c_{init}=f(n_{RNTI},q,c1,n_s,N_{ID}^{NRcell})$, where c1 is equal to 3.

In addition, the parameter $Para_{Syn}$ related to the synchronization signal may further include a parameter y3 related to the sending sequence number of the SS block or the sending sequence number of the uplink RACH occasion, where $y3=f3(b_k)$, and $b_k$ is the sending sequence number of the SS block or the sending sequence number of the uplink RACH occasion.

For example, the parameter $Para_{Syn}$ related to the synchronization signal may alternatively include a port parameter $d_c$ of the synchronization signal. The port parameter of the synchronization signal may be used to indicate at least one of a port number of the synchronization signal and a port group number of the synchronization signal, and a port group includes at least one port. The port number may be a port identification code, or may be a port index number. The port group number may be a port group identification code, or may be a port group index number.

In addition, the parameter $Para_{Syn}$ related to the synchronization signal may further include a parameter y4 related to the port parameter $d_c$, where $Y4=f4(d_c)$. For the port number of the synchronization signal and the port group identification code of the synchronization signal, refer to descriptions of the DMRS.

In one embodiment, the initial scrambling code value $c_{init}$ generated by the TRP based on the configuration parameter may be alternatively expressed as: $c_{init}=f(Para_{Syn})$.

In addition, the initial scrambling code value $c_{init}$ generated by the TRP based on the configuration parameter may be alternatively expressed as:

$c_{init}=f(n_{RNTI},q,Para_{Syn})$, $c_{init}=f(n_{RNTI},q,c1,n_s)$, $c_{init}=f(n_{RNTI},q,c1,n_s,N_{ID}^{NRcell})$, or the like.

In a sixteenth implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter includes a QCL indication parameter $Para_{QLC}$. Different TRPs correspond to different QCL indication parameters. Each TRP corresponds to at least one QCL set, and each of the at least one QCL set is used to record an RS, a synchronization signal block (SS block), and the like that have a quasi co-location relationship. Channel estimation manners of elements included in one QCL set are the same.

The initial scrambling code value $c_{init}$ generated by the TRP based on the configuration parameter may be expressed as: $c_{init}=f(n_{RNTI},q,Para_{QCL},n_s,N_{ID}^{NRcell})$.

For example, $c_{init}=n_{RNTI} \cdot m1+q \cdot m2+Para_{QCL} \cdot m3+\lfloor n_s/2 \rfloor \cdot m4+N_{ID}^{NRcell}$, where m1, m2, m3, and m4 are all constants. For example, $m1=2^{p1}$, $m2=2^{p2}$, $m_3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=n_{RNTI} \cdot 2^{14}+q \cdot 2^{13}+Para_{QCL} \cdot 2^n+\lfloor n_s/2 \rfloor \cdot 2^9+N_{ID}^{NRcell} \quad (22), \text{where}$$

$n_{RNTI}$ is the identification code of the user equipment, q is the parameter used to indicate the codeword sequence number, $Para_{QCL}$ is the QCL indication parameter, $n_s$ is the slot number corresponding to the resource on which the data is located, and $N_{ID}^{NRcell}$ is the cell identification code.

For example, the QCL indication parameter may include at least one of a set identification code of a QCL set and a set index number of the QCL set. Different TRPs belong to different QCL sets. For example, a channel estimation manner of an RS of the first TRP 001 in FIG. 1 is different from a channel estimation manner of an RS of the second TRP 002, and a set identification code of a QCL set to which the RS of the first TRP 001 belongs is 1, that is, $Para_{QCL}$ in the formula (22) is 1. A set identification code of a QCL set to which the RS of the second TRP 002 belongs is 2, that is, $Para_{QCL}$ in the formula (22) is 2.

In addition, the QCL indication parameter may further include a parameter y5 related to the set identification code of the QCL set or the set index number of the QCL set, where $y5=f5(d_{CQL})$, and $d_{CQL}$ is the set identification code of the QCL set or the set index number of the QCL set.

In one embodiment, the initial scrambling code value $c_{init}$ generated by the TRP based on the configuration parameter may be alternatively expressed as: $c_{init}=f(Para_{QCL})$.

In addition, the initial scrambling code value $c_{init}$ generated by the TRP based on the configuration parameter may be alternatively expressed as:

$c_{init}=f(n_{RNTI},q,Para_{QCL})$, $c_{init}=f(n_{RNTI},q,Para_{QCL},n_s)$, $c_{init}=f(n_{RNTI},q,Para_{QCL},n_s,N_{ID}^{NRcell})$, or the like.

In a seventeenth implementable manner, the configuration parameter includes: an identification code $n_{RNTI}$ of the user equipment, a slot number $n_s$ corresponding to a resource on which the data is located, a cell identification code $N_{ID}^{NRcell}$, a parameter q used to indicate a codeword sequence number, and a target parameter, where the target parameter includes a parameter related to the PDCCH, and the parameter related to the PDCCH may be used to indicate configuration information of the PDCCH. For example, the parameter related to the PDCCH may include a resource parameter $Para_{PDCCH}$ of the PDCCH. The resource parameter of the PDCCH may be used to indicate a location of the PDCCH in time domain and/or frequency domain.

The initial scrambling code value $c_{init}$ generated by the TRP based on the configuration parameter may be expressed as: $c_{init}=f(n_{RNTI},q,Para_{PDCCH},n_s,N_{ID}^{NRcell})$.

For example, $c_{init}=n_{RNTI} \cdot m1+q \cdot m2+Para_{PDCCH} \cdot m3+\lfloor n_s/2 \rfloor \cdot m4+N_{ID}^{NRcell}$ where m1, m2, m3, and m4 are all constants. For example, $m1=2^{p1}$, $m2=2^{p2}$, $m3=2^n$, and $m4=2^{p3}$, where p1, p2, n, and p3 are all constants.

For example, the initial scrambling code value $c_{init}$ generated by the TRP based on the configuration parameter may be expressed as:

$$c_{init}=n_{RNTI} \cdot 2^{14}+q \cdot 2^{13}+Para_{PDCCH} \cdot 2^n+\lfloor n_s/2 \rfloor \cdot 2^9+N_{ID}^{NRcell} \quad (23), \text{where}$$

$n_{RNTI}$ is the identification code of the user equipment, q is the parameter used to indicate the codeword sequence number $Para_{PDCCH}$ is the resource parameter of the PDCCH, $n_s$ is the slot number corresponding to the resource on which the data is located, and $N_{ID}^{NRcell}$ is the cell identification code.

For example, the location of the PDCCH in time domain is an identification code of a symbol occupied by the PDCCH, and the location of the PDCCH in frequency domain is an identification code of a subcarrier occupied by the PDCCH.

In addition, the resource parameter $Para_{PDCCH}$ of the PDCCH may further include a parameter y6 related to the identification code of the symbol occupied by the PDCCH or the identification code of the subcarrier, where y6=f6 ($z_{PDCCH}$), and $z_{PDCCH}$ is the identification code of the symbol occupied by the PDCCH or the identification code of the subcarrier.

In one embodiment, the initial scrambling code value $c_{init}$ generated by the TRP based on the configuration parameter may be alternatively expressed as: $c_{init}$=f($Para_{PDCCH}$).

In addition, the initial scrambling code value $c_{init}$ generated by the TRP based on the configuration parameter may be alternatively expressed as:

$c_{init}$=f($n_{RNTI}$,q,$Para_{PDCCH}$), $c_{init}$=f($n_{RNTI}$,q,$Para_{QCL}$,$n_s$), $c_{init}$=f($n_{RNTI}$,q,$Para_{QCL}$,$n_s$,$N_{ID}^{NRcell}$), or the like.

In the first to the seventeenth implementable manners, the target parameter may further include a group identification code of a TRP group to which the TRP belongs, where the TRP group includes at least one TRP. Different TRP groups have different group identifiers. For example, in FIG. 1, a 5G NR cell includes 10 TRPs, the 10 TRPs are classified into two groups, and each group includes five TRPs. A group identification code of a first group is 9, and a group identification code of a second group is 10. For example, the first TRP 001 belongs to the first group, and the second TRP 002 belongs to the second group. In this case, the scrambling code sequence may be obtained based on the group identification code of the TRP group, or the scrambling code sequence may be obtained based on a parameter related to the group identification code of the TRP group. In this embodiment of the present invention, the group identification code of the TRP group is denoted as $N^{TRPSet}$ The group identification code of the TRP group to which the TRP belongs is pre-allocated to the TRP. The TRP generates the initial scrambling code value based on the group identification code of the TRP group to which the TRP belongs. Before transmitting the data, the TRP sends the group identification code of the TRP group to which the TRP belongs to the user equipment, so that the user equipment generates the initial scrambling code value based on the group identification code.

Herein, the initial scrambling code value in the ninth implementable manner is used as an example for description. The target parameter includes the second identification code $N_{ID}^{TRP}$ pre-allocated to the TRP and the group identification code $N^{TRPSetof}$ the TRP group to which the TRP belongs. The initial scrambling code value $c_{init}$ generated by the TRP based on the configuration parameter may be expressed as:

$c_{init}$=f($n_{RNTI}$,q,$N_{ID}^{TRP}$,$N^{TRPSet}$,$n_s$,$N_{ID}^{NRcell}$).

For example, $c_{init}$=$n_{RNTI}$·m1+q·m2+$N_{ID}^{TRP}$·m3+$N^{TRPSet}$·m4+$\lfloor n_s/2 \rfloor$·m5+$N_{ID}^{NRcell}$, where m1, m2, m3, m4, and m5 are all constants. For example, m1=$2^{p1}$, m2=$2^{p2}$, m3=$2^{n1}$, m4=$2^{n2}$, and m5=$2^{p3}$, where p1, p2, n1, n2, and p3 are all constants.

For example, the initial scrambling code value $c_{init}$ generated by the TRP based on the configuration parameter may be expressed as:

$c_{init}$=$n_{RNTI}$·$2^{14}$+q·$2^{13}$+$N_{ID}^{TRP}$·$2^{n1}$+$N^{TRPSet}$·$2^{n2}$+$\lfloor n_s/2 \rfloor$·$2^9$+$N_{ID}^{NRcell}$) (24), where $n_{RNTI}$ is the identification code of the user equipment, $n_s$ is the slot number corresponding to the resource on which the data is located, $N_{ID}^{NRcell}$ is the cell identification code, q is the parameter used to indicate the codeword sequence number, $N_{ID}^{TRP}$ is the second identification code pre-allocated to the TRP, and $N^{TRPSet}$ is the group identification code of the TRP group to which the TRP belongs.

It should be noted that n in the foregoing different formulas may be the same or different, n1 in the different formulas may be the same or different, n2 in the different formulas may be the same or different, m1 in the different formulas may be the same or different, m2 in the different formulas may be the same or different, m3 in the different formulas may be the same or different, m4 in the different formulas may be the same or different, and m5 in the different formulas may be the same or different.

It should be additionally noted that an implementable manner in this embodiment of the present invention is not limited to the foregoing implementable manners. For example, alternatively, the initial scrambling code value may be generated based on the third implementable manner in combination with a first identification code allocated to the TRP, or the initial scrambling code value may be generated based on the fifth implementable manner in combination with an identification code of a beam.

Further, it should be additionally noted that the configuration parameter in this embodiment of the present invention may further include parameters such as a code block group (code block group, CBG) parameter, a bandwidth part (Bandwidth part, BWP) parameter, or a subcarrier spacing (subcarrier spacing) parameter, in addition to the parameters mentioned in the foregoing implementable manners. A parameter included in the configuration parameter is not limited in this embodiment of the present invention. For example, the CBG parameter may be a CBG group identification code, the BWP parameter may be a CBG block identification code, and the subcarrier spacing parameter may be a subcarrier spacing identification code. $c_{init}$=f($n_{RNTI}$,q,$Para_{PDCCH}$,$n_s$,$N_{ID}^{NRcell}$) in the seventeenth implementable manner is used as an example. The initial scrambling code value $c_{init}$ generated by the TRP based on the configuration parameter may be expressed as: $c_{init}$=f($n_{RNTI}$, q,$Para_{PDCCH}$,$n_s$,$NID^{NRcell}$,x,y), where x is the CBG group identification code, and y is the CBG block identification code.

Operation 204: The TRP determines a scrambling code sequence based on the initial scrambling code value.

In one embodiment, the TRP may determine the scrambling code sequence based on the initial scrambling code value obtained in operation 203. The TRP may alternatively determine the scrambling code sequence based on the configuration parameter obtained in operation 202. For a specific process, refer to a related technology. Details are not described herein again.

Operation 205: The TRP scrambles the obtained data by using the scrambling code sequence, to obtain scrambled data.

The TRP obtains the scrambled data based on the scrambling code sequence and a sequence that corresponds to the obtained data. For a specific scrambling process, refer to a related technology.

For example, the first TRP 001 and the second TRP 002 in FIG. 1 scramble the obtained data by using respective obtained scrambling code sequences.

Operation 206: The TRP sends the scrambled data to the user equipment.

For example, in FIG. 1, the first TRP 001 sends the scrambled data obtained by the first TRP 001 to the user equipment 30, and the second TRP 002 sends the scrambled data obtained by the second TRP 002 to the user equipment 30. Because the initial scrambling code value obtained by the first TRP 001 is different from that obtained by the second TRP 002, the scrambling code sequence obtained by the first TRP 001 is different from that obtained by the second TRP 002. Therefore, interference caused by any TRP to another TRP is randomized interference. In this way, the user equipment 30 can better obtain the data sent by the first TRP 001 or the second TRP 002, thereby improving system performance.

Operation 207: The user equipment obtains the scrambling code sequence.

The user equipment obtains the scrambling code sequence based on the initial scrambling code value. Specifically, the user equipment obtains the configuration parameter, generates the initial scrambling code value based on the configuration parameter, and then determines the scrambling code sequence based on the initial scrambling code value. The user equipment descrambles, by using a corresponding scrambling code sequence, scrambled data sent by each TRP. For example, in FIG. 1, the first TRP 001 obtains a scrambling code sequence F, and the user equipment 30 obtains a scrambling code sequence that is the same as the scrambling code sequence F, to descramble the scrambled data obtained by the first TRP 001. The second TRP 002 obtains a scrambling code sequence E, and the user equipment 30 obtains a scrambling code sequence that is the same as the scrambling code sequence E, to descramble the scrambled data obtained by the second TRP 002.

For a process in which the user equipment obtains the scrambling code sequence, refer to a corresponding process in the foregoing plurality of implementable manners.

Operation 208: The user equipment descrambles the scrambled data by using the scrambling code sequence.

For example, in FIG. 1, the first TRP 001 scrambles obtained data x1 by using the scrambling code sequence F, to obtain scrambled data y1. The second TRP 002 scrambles obtained data x2 by using the scrambling code sequence E, to obtain scrambled data y2. The first TRP 001 sends the scrambled data y1 to the user equipment 30, and the second TRP 002 sends the scrambled data y2 to the user equipment 30. After receiving the scrambled data y1 sent by the first TRP 001, the user equipment 30 obtains the scrambling code sequence F, and descrambles the scrambled data y1 by using the scrambling code sequence F, to obtain x1. After receiving the scrambled data y2 sent by the second TRP 002, the user equipment 30 obtains the scrambling code sequence E, and descrambles the scrambled data y2 by using the scrambling code sequence E, to obtain x2.

In an actual application, the first TRP 001 and the second TRP 002 in FIG. 1 are used as an example for description. In a process in which the first TRP 001 sends the scrambled data to the user equipment 30, the second TRP 002 also sends the scrambled data to the user equipment 30. As a result, the second TRP 002 causes interference to a sending process of the first TRP 001. Finally, data received by the user equipment 30 includes the scrambled data sent by the first TRP 001 and the scrambled data sent by the second TRP 002. Because the scrambling code sequence obtained by the first TRP is different from that obtained by the second TRP 002, interference caused by the second TRP 002 to the first TRP 001 is randomized interference. Therefore, the user equipment 30 can better obtain, from the received data, the scrambled data sent by the first TRP 001. After obtaining the scrambled data sent by the first TRP 001, the user equipment 30 descrambles the scrambled data by using a corresponding scrambling code sequence, to obtain the original data. Similarly, the user equipment 30 can better obtain, from the received data, the scrambled data sent by the second TRP 002, and descramble the scrambled data by using a corresponding scrambling code sequence, to obtain the original data.

It should be noted that a sequence of the operations of the scrambling code sequence generation method provided in this embodiment of the present invention may be properly adjusted. Alternatively, operations may be correspondingly added or removed based on a particular case. Any variation method readily figured out by a person skilled in the art within the technical scope disclosed in the present invention shall fall within the protection scope of the present invention. Therefore, details are not described again.

In conclusion, according to the scrambling code sequence generation method provided in this embodiment of the present invention, the scrambling code sequence can be determined based on the configuration parameter of the TRP, and the data is scrambled or descrambled by using the scrambling code sequence. Different TRPs correspond to different configuration parameters. Compared with a related technology, different TRPs obtain different scrambling code sequences, and interference caused by any TRP to another TRP is randomized interference, thereby improving system performance.

FIG. 3-1 is a schematic structural diagram of a scrambling code sequence generation apparatus 300 according to an embodiment of the present invention. The scrambling code sequence generation apparatus 300 may be applied to the TRP in the implementation environment shown in FIG. 1, or may be applied to user equipment. The TRP may be a data transmit end, or may be a data receive end. As shown in FIG. 3-1, the scrambling code sequence generation apparatus 300 includes:

a determining module 310, configured to determine a scrambling code sequence based on a configuration parameter of the TRP, where different TRPs correspond to different configuration parameters; and a processing module 320, configured to scramble or descramble data by using the scrambling code sequence determined by the determining module.

In one embodiment, as shown in FIG. 3-2, the determining module 310 may include:

a generation submodule 311, configured to implement operation 203 in the foregoing embodiment; and a determining submodule 312, configured to implement operation 204 in the foregoing embodiment.

In one embodiment, the configuration parameter includes a target parameter, and different TRPs correspond to different target parameters.

Further, the configuration parameter further includes: at least one of an identification code of user equipment, a slot number corresponding to a resource on which the data is located, a cell identification code, and a parameter used to indicate a codeword sequence number.

In one embodiment, the target parameter may include at least one of a parameter related to an RS, a beam parameter, a first identification code allocated to the TRP, a second identification code pre-allocated to the TRP, a parameter related to a synchronization signal, a QCL indication parameter, and a parameter related to a PDCCH.

The parameter related to the RS may be used to indicate configuration information of the RS, the beam parameter is used to indicate a beam for data transmission, the first identification code is used to generate an initial scrambling code value, the second identification code is used to indicate a TRP, different TRPs have different QCL indication parameters, and the parameter related to the PDCCH may be used to indicate configuration information of the PDCCH.

In one embodiment, the parameter related to the RS includes at least one of a port parameter of the RS and a resource parameter of the RS. For example, the port parameter of the RS may be used to indicate at least one of a port number of the RS and a port group number of the RS, and a port group includes at least one port. The port number may be a port identification code, or may be a port index number. The port group number may be a port group identification code, or may be a port group index number.

The resource parameter of the RS may be used to indicate a location of the RS in time domain and/or frequency domain. The RS is a DMRS, a CSI-RS, a PT-RS, a TRS, or an SRS. The DMRS may be an uplink DMRS or a downlink DMRS. The uplink DMRS may be a data channel DMRS or a control channel DMRS. The downlink DMRS may be a data channel DMRS or a control channel DMRS.

In one embodiment, the beam parameter may be used to indicate an identification code of a beam for data transmission.

In one embodiment, the parameter related to the synchronization signal may include at least one of a preset parameter used to instruct to determine a synchronization signal sequence, a resource parameter of the synchronization signal, and a port parameter of the synchronization signal. The preset parameter is a root sequence parameter, a cyclic shift parameter, or a scrambling parameter. The resource parameter of the synchronization signal may be used to indicate a sending sequence number of an SS block of the synchronization signal or a sending sequence number of an uplink RACH occasion. The port parameter of the synchronization signal may be used to indicate at least one of a port number of the synchronization signal and a port group number of the synchronization signal, and a port group includes at least one port. The port number may be a port identification code, or may be a port index number. The port group number may be a port group identification code, or may be a port group index number.

For example, the synchronization signal may be a PSS, an SSS, or a PRACH signal.

In one embodiment, the QCL indication parameter may be used to indicate at least one of a set identification code of a QCL set and a set index number of the QCL set.

In one embodiment, the parameter related to the PDCCH may include a resource parameter of the PDCCH. The resource parameter of the PDCCH may be used to indicate a location of the PDCCH in time domain and/or frequency domain.

In one embodiment, identification codes allocated by different TRPs to the user equipment are different.

Further, the target parameter further includes a group identification code of a TRP group to which the TRP belongs. The TRP group includes at least one TRP.

In conclusion, the scrambling code sequence generation apparatus provided in this embodiment of the present invention can determine the scrambling code sequence based on the configuration parameter of the TRP, and scramble or descramble the data by using the scrambling code sequence. Different TRPs correspond to different configuration parameters. Compared with a related technology, different TRPs obtain different scrambling code sequences, and interference caused by any TRP to another TRP is randomized interference, thereby improving system performance.

Figure 4:
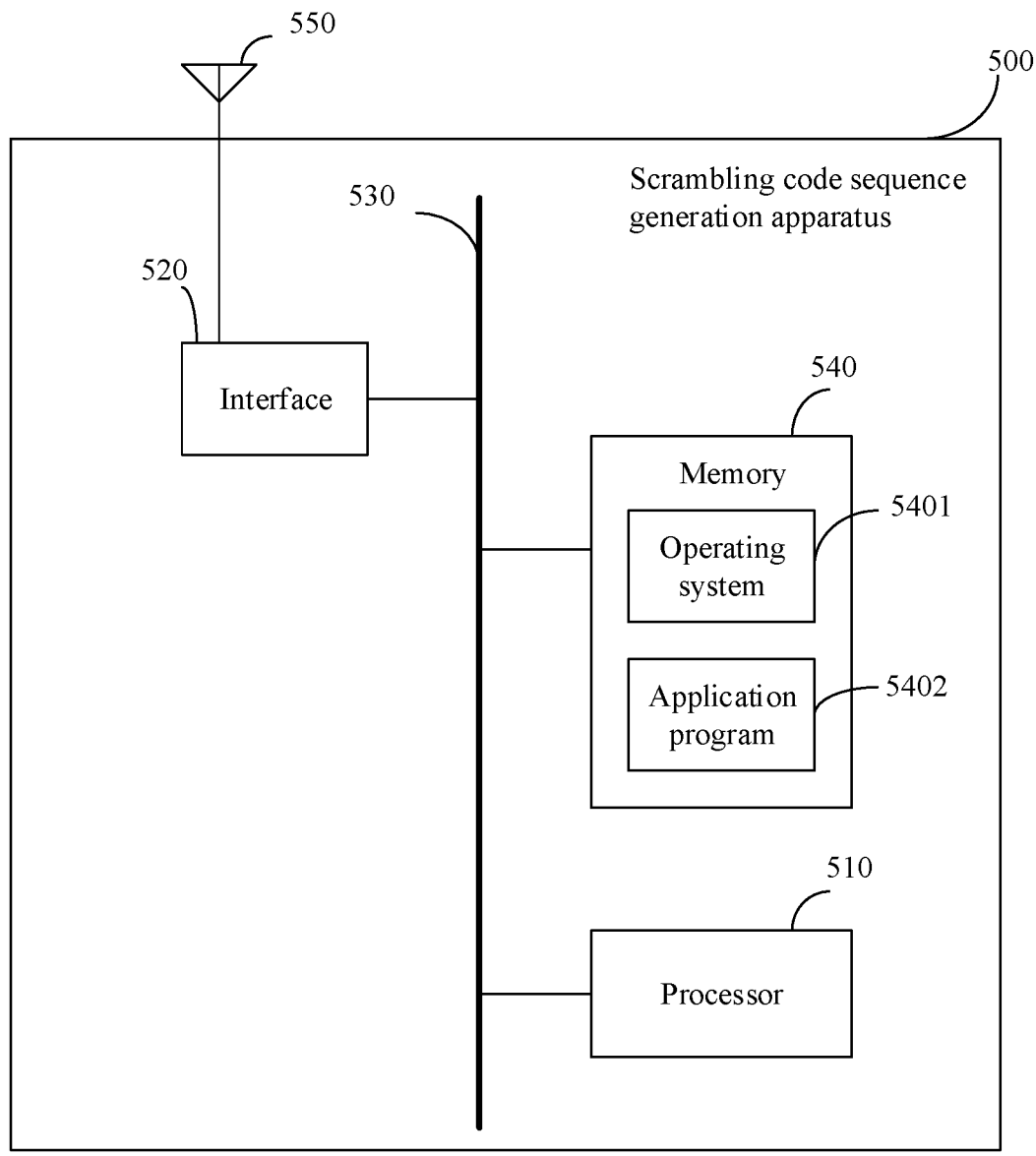
FIG. 4 is a schematic structural diagram of another scrambling code sequence generation apparatus according to an embodiment of the present invention.

FIG. 4 is a schematic structural diagram of a scrambling code sequence generation apparatus 500 according to an embodiment of the present invention. The scrambling code sequence generation apparatus 500 may be applied to the TRP in the implementation environment shown in FIG. 1, or may be applied to user equipment. The TRP may be a data transmit end, or may be a data receive end. As shown in FIG. 4, the scrambling code sequence generation apparatus 500 includes at least one processor 510 and at least one interface 520, where the processor 510 and the interface 520 are connected by using a bus 530.

The processor 510 is configured to: determine a scrambling code sequence based on a configuration parameter of a TRP, where different TRPs correspond to different configuration parameters; and scramble or descramble data by using the scrambling code sequence.

In conclusion, the scrambling code sequence generation apparatus provided in this embodiment of the present invention can determine the scrambling code sequence based on the configuration parameter of the TRP, and scramble or descramble the data by using the scrambling code sequence. Different TRPs correspond to different configuration parameters. Compared with a related technology, different TRPs obtain different scrambling code sequences, and interference caused by any TRP to another TRP is randomized interference, thereby improving system performance.

The processor 510 is specifically configured to:

generate an initial scrambling code value based on the configuration parameter; and determine the scrambling code sequence based on the initial scrambling code value.

In one embodiment, the configuration parameter includes a target parameter, and different TRPs correspond to different target parameters.

Further, the configuration parameter further includes: at least one of an identification code of user equipment, a slot number corresponding to a resource on which the data is located, a cell identification code, and a parameter used to indicate a codeword sequence number.

In one embodiment, the target parameter may include at least one of a parameter related to an RS, a beam parameter, a first identification code allocated to the TRP, a second identification code pre-allocated to the TRP, a parameter related to a synchronization signal, a QCL indication parameter, and a parameter related to a PDCCH.

The parameter related to the RS may be used to indicate configuration information of the RS, the beam parameter is used to indicate a beam for data transmission, the first identification code is used to generate an initial scrambling code value, the second identification code is used to indicate a TRP, different TRPs have different QCL indication parameters, and the parameter related to the PDCCH may be used to indicate configuration information of the PDCCH.

In one embodiment, the parameter related to the RS includes at least one of a port parameter of the RS and a resource parameter of the RS. For example, the port parameter of the RS may be used to indicate at least one of a port number of the RS and a port group number of the RS, and a port group includes at least one port. The port number may be a port identification code, or may be a port index number. The port group number may be a port group identification code, or may be a port group index number.

The resource parameter of the RS may be used to indicate a location of the RS in time domain and/or frequency domain. The RS is a DMRS, a CSI-RS, a PT-RS, a TRS, or an SRS. The DMRS may be an uplink DMRS or a downlink DMRS. The uplink DMRS may be a data channel DMRS or a control channel DMRS. The downlink DMRS may be a data channel DMRS or a control channel DMRS.

In one embodiment, the beam parameter may be used to indicate an identification code of a beam for data transmission.

In one embodiment, the parameter related to the synchronization signal may include at least one of a preset parameter used to instruct to determine a synchronization signal sequence, a resource parameter of the synchronization signal, and a port parameter of the synchronization signal. The preset parameter is a root sequence parameter, a cyclic shift parameter, or a scrambling parameter. The resource parameter of the synchronization signal may be used to indicate a sending sequence number of an SS block of the synchronization signal or a sending sequence number of an uplink RACH occasion. The port parameter of the synchronization signal may be used to indicate at least one of a port number of the synchronization signal and a port group number of the synchronization signal, and a port group includes at least one port. The port number may be a port identification code, or may be a port index number. The port group number may be a port group identification code, or may be a port group index number. For example, the synchronization signal may be a PSS, an SSS, or a PRACH signal.

In one embodiment, the QCL indication parameter may be used to indicate at least one of a set identification code of a QCL set and a set index number of the QCL set.

In one embodiment, the parameter related to the PDCCH includes a resource parameter of the PDCCH. The resource parameter of the PDCCH may be used to indicate a location of the PDCCH in time domain and/or frequency domain.

In one embodiment, identification codes allocated by different TRPs to the user equipment are different.

In one embodiment, the target parameter further includes a group identification code of a TRP group to which the TRP belongs, where the TRP group includes at least one TRP.

For example, the processor may be a chip, and when implemented by using hardware, the processor may be a logic circuit, an integrated circuit, or the like. The processor may be a general-purpose processor, and is implemented by reading software code stored in a memory. The memory may be integrated into the processor, or may exist independently outside the processor. Correspondingly, as shown in FIG. 4, the scrambling code sequence generation apparatus 500 may further include a memory 540. The memory 540 includes an operating system 5401 and an application program 5402. The operating system 5401 includes various operating system programs, configured to implement various hardware-based operations. The application program 5402 includes various application programs, for example, a data scrambling program or a data descrambling program, configured to implement various application functions. The data scrambling program can enable the scrambling code sequence generation apparatus to scramble obtained data by using a scrambling code sequence, to obtain scrambled data. The data descrambling program can enable the scrambling code sequence generation apparatus to descramble received scrambled data by using a scrambling code sequence. The processor 510 may execute the application program stored in the memory 540, to coordinately implement the scrambling code sequence generation method shown in FIG. 2-1.

The scrambling code sequence generation apparatus provided in this embodiment of the present invention implements, through coordination between the foregoing execution modules, various functions implemented by the scrambling code sequence generation apparatus in the apparatus embodiment shown in FIG. 3-1. The determining module 310 in FIG. 3-1 may be implemented by the processor, or may be implemented by the processor executing the application program stored in the memory.

It should be understood that, the processor 510 in this embodiment of the present invention may be a central processing unit (CPU), the processor 510 may alternatively be another general-purpose processor, a digital signal processor (DSP), an application-specific integrated circuit (ASIC), a field-programmable gate array (FPGA), or another programmable logical device, discrete gate or transistor logical device, discrete hardware component, or the like. The general-purpose processor may be a microprocessor, or the processor may be any conventional processor or the like.

In an implementation process, the foregoing operations can be implemented by using a hardware integrated logical circuit in the processor 510, or by using instructions in a form of software. The operations of the method disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor 510 reads information in the memory and completes the operations in the foregoing method in combination with hardware of the processor.

Further, the scrambling code sequence generation apparatus further includes an antenna 550. The scrambling code sequence generation apparatus further includes other functional components, such as a battery module and a wired/wireless charging structure. The antenna 550 is configured to send and receive a radio signal. The antenna 550 may coordinate with the interface 520 to send and receive a signal in, for example such as a 5G technology.

In conclusion, the scrambling code sequence generation apparatus provided in this embodiment of the present invention can determine the scrambling code sequence based on the configuration parameter of the TRP, scramble or descramble the data by using the scrambling code sequence. Different TRPs correspond to different configuration parameters. Compared with a related technology, different TRPs obtain different scrambling code sequences, and interference caused by any TRP to another TRP is randomized interference, thereby improving system performance.

It may be clearly understood by a person skilled in the art that, for the purpose of convenient and brief description, for a detailed working process of the foregoing apparatuses and modules, refer to a corresponding process in the foregoing method embodiment, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In the several embodiments provided in this application, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

A person of ordinary skill in the art may understand that all or some of the operations of the embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A scrambling code sequence generation apparatus, comprising one or more processors configured to:
    determine a scrambling code sequence based on a configuration parameter of a transmission reception point (TRP), wherein different TRPs correspond to different configuration parameters,
    wherein the configuration parameter comprises a target parameter, and different TRPs correspond to different target parameters,
    wherein the target parameter comprises a first identification code allocated to the TRP and a second identification code pre-allocated to the TRP, the first identification code is used to generate an initial scrambling code value and the second identification code is used to indicate the TRP; and
    scramble or descramble data by using the scrambling code sequence.

2. The apparatus according to claim 1, wherein the one or more processors are further configured to:
    generate the initial scrambling code value based on the configuration parameter; and
    determine the scrambling code sequence based on the initial scrambling code value.

3. The apparatus according to claim 1, wherein the configuration parameter further comprises: at least one of an identification code of user equipment, a slot number corresponding to a resource on which the data is located, a cell identification code, or a parameter used to indicate a codeword sequence number.

4. The apparatus according to claim 3, wherein
    the target parameter further comprises at least one of a parameter related to a reference signal (RS), a beam parameter, a parameter related to a synchronization signal, a quasi co-location (QCL) indication parameter, and a parameter related to a physical downlink control channel (PDCCH).

5. The apparatus according to claim 4, wherein the parameter related to the RS comprises at least one of a port parameter of the RS and a resource parameter of the RS.

6. The apparatus according to claim 5, wherein
    the port parameter of the RS is used to indicate at least one of a port number of the RS and a port group number of the RS, and a port group comprises at least one port.

7. The apparatus according to claim 5, wherein
    the resource parameter of the RS is used to indicate a location of the RS in time domain and/or frequency domain.

8. The apparatus according to claim 4, wherein
    the beam parameter is used to indicate an identification code of a beam for data transmission.

9. The apparatus according to claim 4, wherein
    the parameter related to the synchronization signal comprises at least one of a preset parameter used to determine a synchronization signal sequence, a resource parameter of the synchronization signal, and a port parameter of the synchronization signal, and the preset parameter is a root sequence parameter, a cyclic shift parameter, or a scrambling parameter.

10. The apparatus according to claim 4, wherein
    the synchronization signal is a primary synchronization signal (PSS), a secondary synchronization signal (SSS), or a physical random access channel (PRACH) signal.

11. The apparatus according to claim 4, wherein
    the QCL indication parameter is used to indicate at least one of a set identification code of a QCL set and a set index number of the QCL set.

12. The apparatus according to claim 4, wherein
    the parameter related to the PDCCH comprises a resource parameter of the PDCCH.

13. A scrambling code sequence generation apparatus, comprising a processor and an interface, wherein the processor is configured to:
    determine a scrambling code sequence based on a configuration parameter of a transmission reception point (TRP), wherein different TRPs correspond to different configuration parameters,
    wherein the configuration parameter comprises a target parameter, and different TRPs correspond to different target parameters,
    wherein the target parameter comprises a first identification code allocated to the TRP and a second identification code pre-allocated to the TRP, the first identification code is used to generate an initial scrambling code value and the second identification code is used to indicate the TRP; and scramble or descramble data by using the scrambling code sequence.

14. A non-transitory computer-readable storage medium, wherein the computer-readable storage medium stores an instruction, when the computer-readable storage medium runs on a computer, the computer is enabled to perform a scrambling code sequence generation method, and the method comprises:
determining a scrambling code sequence based on a configuration parameter of a transmission reception point (TRP), wherein different TRPs correspond to different configuration parameters,
wherein the configuration parameter comprises a target parameter, and different TRPs correspond to different target parameters,
wherein the target parameter comprises a first identification code allocated to the TRP and a second identification code pre-allocated to the TRP, the first identification code is used to generate an initial scrambling code value and the second identification code is used to indicate the TRP; and
scrambling or descrambling data by using the scrambling code sequence.

15. The non-transitory computer-readable storage medium according to claim 14, wherein determining a scrambling code sequence comprises:
generating the initial scrambling code value based on the configuration parameter; and
determining the scrambling code sequence based on the initial scrambling code value.

16. The non-transitory computer-readable storage medium according to claim 14, wherein
the configuration parameter comprises a target parameter, and different TRPs correspond to different target parameters.

17. The computer-readable storage medium according to claim 16, wherein the configuration parameter further comprises: at least one of an identification code of user equipment, a slot number corresponding to a resource on which the data is located, a cell identification code, or a parameter used to indicate a codeword sequence number.

18. The non-transitory computer-readable storage medium according to claim 17, wherein
the target parameter comprises at least one of a parameter related to a reference signal (RS), a beam parameter a parameter related to a synchronization signal, a quasi co-location (QCL) indication parameter, and a parameter related to a physical downlink control channel (PDCCH).

19. The non-transitory computer-readable storage medium according to claim 18, wherein the parameter related to the RS comprises at least one of a port parameter of the RS and a resource parameter of the RS.

* * * * *